United States Patent
Aizawa et al.

(10) Patent No.: US 7,028,216 B2
(45) Date of Patent: Apr. 11, 2006

(54) DISK ARRAY SYSTEM AND A METHOD OF AVOIDING FAILURE OF THE DISK ARRAY SYSTEM

(75) Inventors: Masaki Aizawa, Odawara (JP); Eiju Katsuragi, Odawara (JP); Mikio Fukuoka, Odawara (JP); Takeki Okamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 103 days.

(21) Appl. No.: 10/782,925

(22) Filed: Feb. 23, 2004

(65) Prior Publication Data

US 2005/0114728 A1 May 26, 2005

(30) Foreign Application Priority Data

Nov. 26, 2003 (JP) ............... 2003-395322

(51) Int. Cl.
*G06F 11/00* (2006.01)
(52) U.S. Cl. .......................... 714/7; 711/114
(58) Field of Classification Search .......... 714/5–13, 714/42, 54, 702, 710, 718, 799, 805; 711/161–162, 711/113–114, 154, 168
See application file for complete search history.

(56) References Cited

U.S. PATENT DOCUMENTS

| | | | |
|---|---|---|---|
| 5,579,474 A | | 11/1996 | Kakuta et al. |
| 5,617,425 A | * | 4/1997 | Anderson ............ 714/710 |
| 6,442,711 B1 | | 8/2002 | Sasamoto et al. |
| 6,615,314 B1 | * | 9/2003 | Higaki et al. ............ 711/114 |
| 6,757,782 B1 | * | 6/2004 | Higaki et al. ............ 711/114 |
| 6,859,888 B1 | | 2/2005 | Furuya et al. |
| 2002/0066050 A1 | * | 5/2002 | Lerman et al. ............ 714/6 |
| 2002/0162057 A1 | | 10/2002 | Talagala |
| 2003/0233613 A1 | | 12/2003 | Ash et al. |
| 2004/0148544 A1 | * | 7/2004 | Higaki et al. ............ 714/7 |
| 2004/0148545 A1 | * | 7/2004 | Higaki et al. ............ 714/7 |
| 2004/0153844 A1 | | 8/2004 | Ghose et al. |
| 2004/0158672 A1 | * | 8/2004 | Higaki et al. ............ 711/114 |

FOREIGN PATENT DOCUMENTS

JP  7-146760  11/1993

* cited by examiner

*Primary Examiner*—Dieu-Minh Le
(74) *Attorney, Agent, or Firm*—Reed Smith LLP; Stanley P. Fisher, Esq.; Juan Carlos A. Marquez, Esq.

(57) ABSTRACT

The invention is intended to reduce disk access during data transfer from a disk in which occurrence of failure is anticipated to a spare disk as much as possible so that occurrence of double-failure is prevented in advance. When occurrence of failure in a disk which configures a RAID group, contents stored in the disk is copied to the spared disk. Simultaneously, another RAID group is paired with the above described RAID group and a secondary volume is provided therein. A write request is directed to the secondary volume. A differential bitmap controls a update data. Data which is not updated is read out from the primary volume, and data which is already updated is read from the secondary volume. When data transfer is completed, contents stored in the secondary volume are copied to the primary volume.

20 Claims, 29 Drawing Sheets

FIG. 3A

| PRIMARY VOLUME# | SECONDARY VOLUME# | PAIRING STATUS | DIFFERENTIAL BITMAP |
|---|---|---|---|
| 4 | 7 | DUPLEX | 010000100000··· |
| 5 | 8 | DUPLEX | 100000010000··· |

| PRIMARY VOLUME# | SECONDARY VOLUME# | PAIRING STATUS | DIFFERENTIAL BITMAP |
|---|---|---|---|
| 4 | 7 | DUPLEX | 010000100000··· |
| 5 | 8 | DUPLEX | 100000010000··· |
| 1 | 13 | UPDATE DATA BEING BACKED UP | 110000100011··· |
| 2 | 14 | UPDATE DATA BEING BACKED UP | 100001000000··· |
| 3 | 15 | UPDATE DATA BEING BACKED UP | 000000000000··· |

~T2

1100001000111100 ⋯  ~20

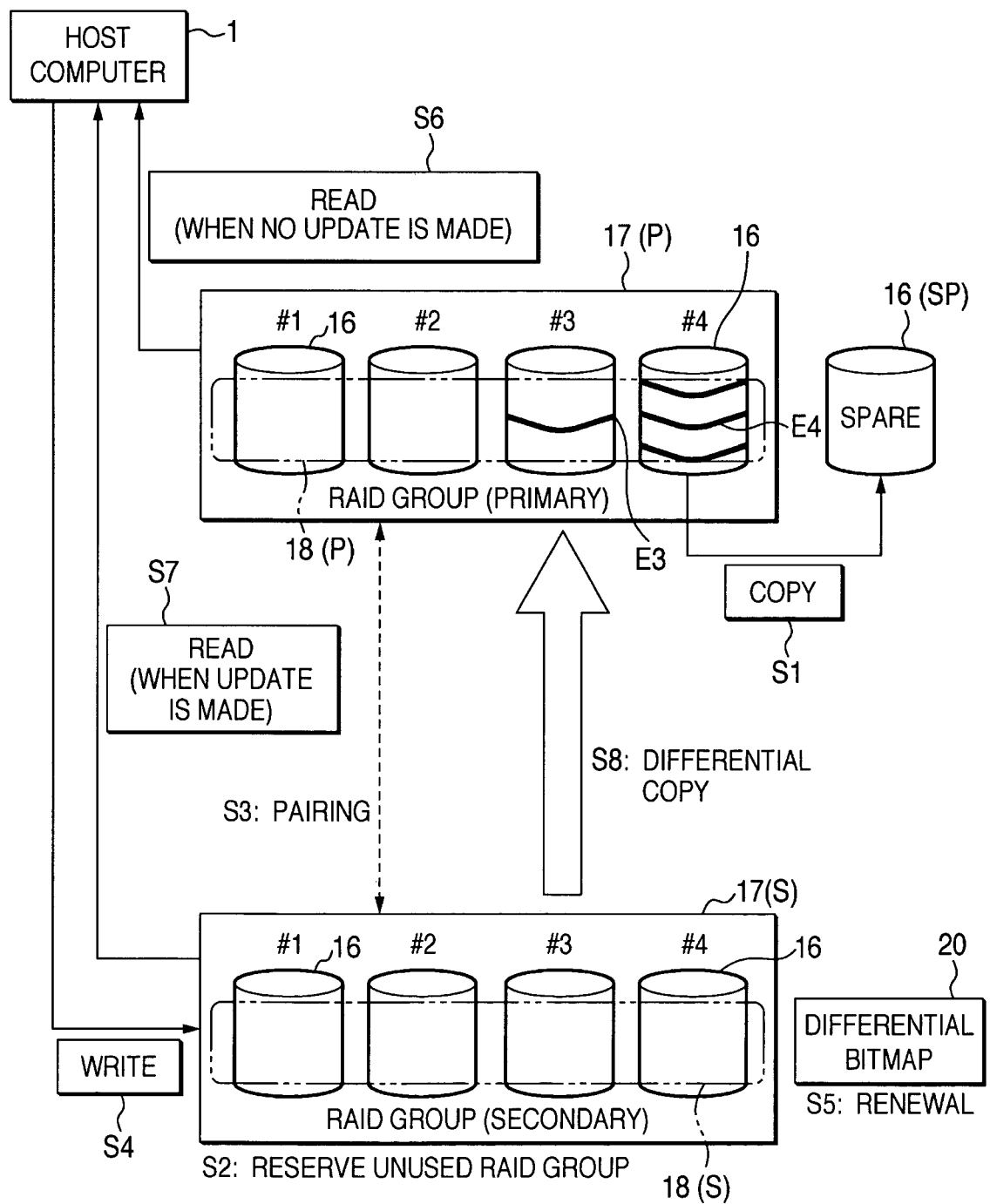

| WORK VOLUME# | CAPACITY | PRIMARY VOLUME# | TERMINAL ADDRESS | DIFFERENTIAL BITMAP | T4 |
|---|---|---|---|---|---|
| 10 | 3GB | NULL | NULL | 0000000000··· | |
| 11 | 3GB | NULL | NULL | 0000000000··· | |
| 12 | 3GB | NULL | NULL | 0000000000··· | |

| WORK VOLUME# | CAPACITY | PRIMARY VOLUME# | TERMINAL ADDRESS | DIFFERENTIAL BITMAP | T4 |
|---|---|---|---|---|---|
| 10 | 3GB | 1 | 3 | 1110000000··· | |
| 11 | 3GB | 2 | NULL | 0000000000··· | |
| 12 | 3GB | 3 | NULL | 0000000000··· | |

FIG. 15A

| DISK# | CAPACITY | STATUS | T5 |
|---|---|---|---|
| 1 | 18GB | RENEWED DATA BEING BACKED UP |
| 2 | 18GB | RENEWED DATA BEING BACKED UP |
| 3 | 18GB | RENEWED DATA BEING BACKED UP |
| 4 | 18GB | RENEWED DATA BEING BACKED UP |
| 5 | 18GB | NULL |
| ⋮ | ⋮ | ⋮ |

| DISK# | CAPACITY | STATUS | MAIN DISK# | TERMINAL ADDRESS |
|---|---|---|---|---|
| 60 | 18GB | UNUSED | NULL | NULL |
| 61 | 18GB | UNUSED | NULL | NULL |

| DISK# | CAPACITY | STATUS | MAIN DISK# | TERMINAL ADDRESS |
|---|---|---|---|---|
| 60 | 18GB | IN USE | 1, 2, 3, 4 | 6 |
| 61 | 18GB | UNUSED | NULL | NULL |

FIG. 16

| MAIN DISK# | MAIN DISK ADDRESS | WORK DISK# | WORK DISK ADDRESS |
|---|---|---|---|
| 1 | 1 | 60 | 1 |
| 1 | 2 | 60 | 2 |
| 2 | 5 | 60 | 3 |
| 2 | 2 | 60 | 4 |
| 2 | 6 | 60 | 5 |
| 3 | 3 | 60 | 6 |

T7

TERMINAL ADDRESS →

FIG. 20A

| WORK VOLUME # | CAPACITY | MAIN VOLUME # | TERMINAL ADDRESS | DIFFERENTIAL BITMAP |
|---|---|---|---|---|
| 10 | 3GB | 1, 4 | 3 | 1110000000··· |
| 11 | 3GB | 2, 5 | NULL | 0000000000··· |
| 12 | 3GB | 3, 6 | NULL | 0000000000··· |

| DISK# | CAPACITY | STATUS | MAIN DISK# | TERMINAL ADDRESS |
|---|---|---|---|---|
| 60 | 18GB | IN USE | 1, 2, 3, 4, 5, 6, 7, 8 | 6 |
| 61 | 18GB | UNUSED | NULL | NULLL |

T6

DISK ARRAY SYSTEM AND A METHOD OF AVOIDING FAILURE OF THE DISK ARRAY SYSTEM

CROSS-REFERENCE TO RELATED APPLICATIONS

This application relates to and claims priority from Japanese Patent Application No. 2003-395322, filed on Nov. 26, 2003, the entire disclosure of which is incorporated herein by reference.

BACKGROUND OF THE INVENTION

1. Field of the Invention

The present invention relates to a disk array system having a plurality of disk drives and a method of avoiding failure of the disk array system.

2. Description of the Related Art

The disk array system, including a number of disk drives in an array, is configured based on RAID (Redundant Array of Independent Inexpensive Disks). A logical volume, which is a logical storage area, is formed on a physical storage area possessed by each disk device. A host computer can read and write desired data by issuing a write command or a read command of a predetermined format to the disk array system.

Various defensive measures are taken for the disk array system in order to prevent loss of data stored in the disk drive. One is an employment of RAID configuration. For example, by employing a redundant storage configuration known as RAID levels 1 to 6 in the disk array system, possibility of data loss decreases. In addition, in the disk array system, for example, it is possible to store the identical data into a pair of logical volumes; a primary volume and a secondary volume; by duplicating the logical volume in the RAID configuration. Alternatively, as known so-called as a disaster recovery, there is a case where data copy is stored to a remote site located far away from a local site, considering an inadvertent situation such as natural disaster and the like. Data stored in the disk array system is regularly stored in a backup device such as a tape drive.

In addition, in the disk array system, duplication of physical structure is also employed. For example, the disk array system is multiplexed by providing a plurality of main units such as host interface circuits for performing data communication with the host computer or a lower level interface circuit for performing data communication with each disk drive. There are also provided a plurality of paths for connecting these main units and power sources for supplying a power to these main units.

In addition to these units, the disk array system may be provided with one or more spare disk drives. When any failure occurred in the disk drive in which data is stored, the data stored in the faulty disk drive is copied in the spare disk. For example, by executing inverse operation based on data and parity stored dispersedly in other disk drive, the data in the faulty disk drive is recovered (JP-A-7-146760). Subsequently, the faulty disk drive is taken out, and replaced with a new disk drive or a spare disk drive.

In the related art, when a failure occurred in the disk drive, data stored in the faulty disk drive is recovered based on data and parity stored in another normal disk drive. In the related art, recovered data is then stored in the spare disk drive. In this manner, in the related art, data copy to the spare disk drive is not performed until a failure is actually occurred in a certain disk drive. Therefore, timing to start data copy to the spare disk drive is delayed. In addition, since data is recovered from a normal disk drive, it takes a long time to recover the data, and it also takes a long time until data copy is completed.

In addition, when any failure occurred successively in the part of another normal disk drive, data required for inverse operation cannot be obtained, and thus data of the faulty disk drive cannot be recovered. Even with the normal disk drive, when read and write operation is repeated, possibility of occurrence of partial failure increases. When two or more parts of information (data, parity) cannot be read, data cannot be recovered by inverse operation and thus unrecoverable data will be lost.

SUMMARY OF THE INVENTION

It is an object of the present invention to provide a disk array system which can transfer data from a disk drive in which occurrence of failure is anticipated to a spare disk drive in a safer manner than in the related art, and a method of avoiding failure of the disk array system. Another object of the invention to provide a disk array system in which possibility of occurrence of failure in a normal disk drive is reduced by reducing writing and reading to a normal disk drive other than the disk drive in which occurrence of failure is anticipated and a method of avoiding failure of the disk array system. Other objects of the invention will be apparent from description of embodiments described later.

BRIEF DESCRIPTION OF THE DRAWINGS

FIG. 2 is an explanatory drawing showing a configuration of RAID configuration management table, in which

FIG. 3 is an explanatory drawing showing a configuration of a pairing information management table, in which FIG. 3A shows a state before execution of the sparing process, and FIG. 3B shows a state after execution of the sparing process;

FIG. 5 is a schematic explanatory drawing generally showing a method of avoiding data failure according to a first embodiment;

FIG. 11 is an explanatory drawing showing a work volume management table and the like, in which

FIG. 15 is an explanatory drawing showing a management table, in which FIG. 15A shows a disk management table, FIG. 15B shows a work disk management table before execution of the sparing process, and FIG. 15C shows a work disk management table after execution of the sparing process;

FIG. 16 is an explanatory drawing showing a differential management table;

FIG. 20 is an explanatory drawing showing extended states of management tables in which FIG. 20A shows an extended work volume management table, and FIG. 20B shows an extended work disk management table, respectively;

DESCRIPTION OF THE SPECIFIC EMBODIMENTS

Figure 1:
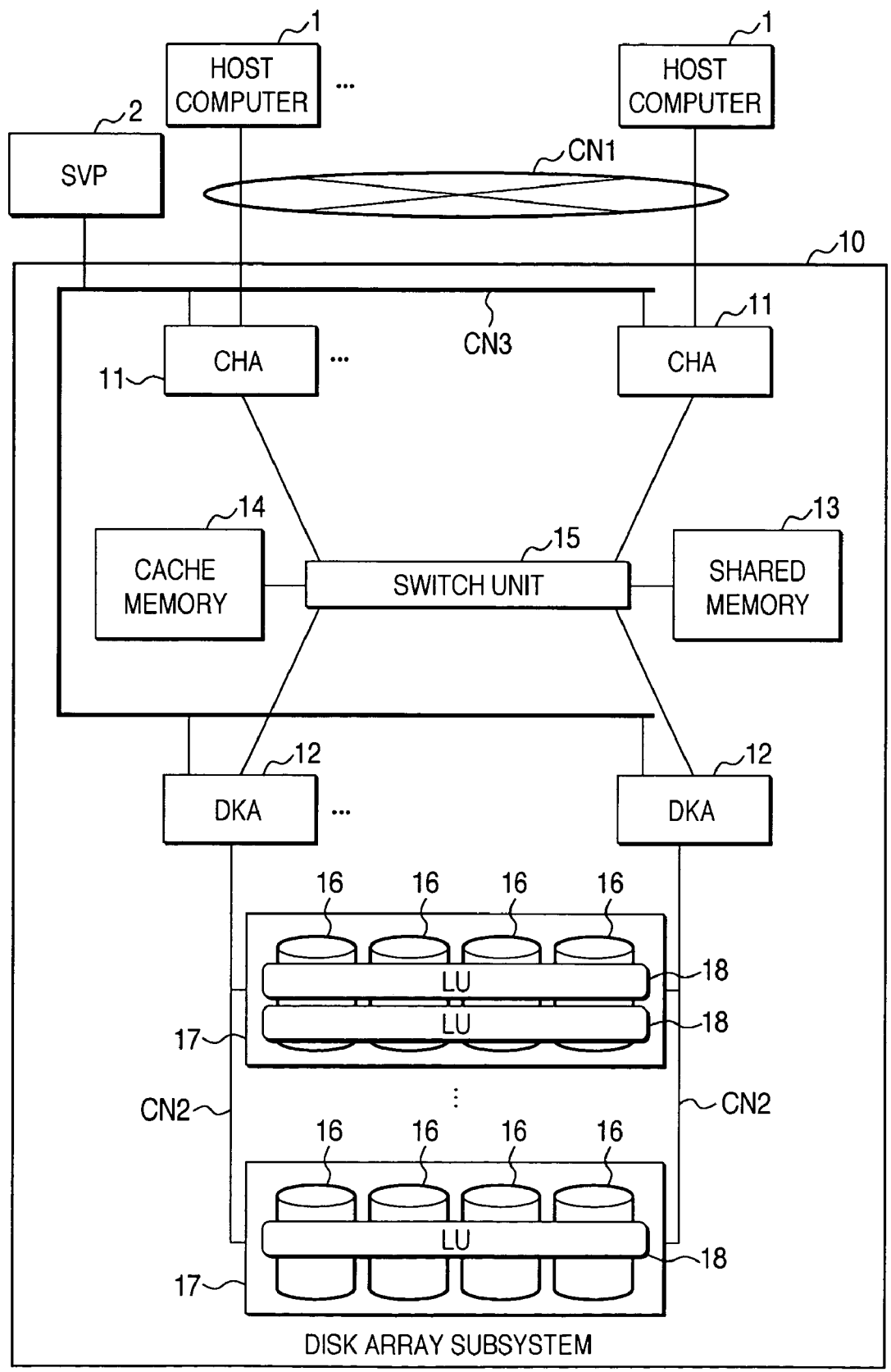
FIG. 1 is a schematic block diagram generally showing a disk array system according to an embodiment of the invention.

In order to solve the problem described above, a disk array system according to the present invention includes a channel adapter for controlling data transfer with respect to a host device, a plurality of data disk drives configuring a RAID group, at least one spare disk drive provided as a spare for the data disk drives, a disk adapter for controlling data transfer with respect to the data disk drives and the spare disk drive, a cache memory used by the channel adapter and the disk adapter for storing data, a control memory used by the channel adapter and the disk adapter for storing management information, a backup storage provided separately from the data disk drives and the spare disk drive, a first control unit provided in the disk adapter for observing occurrence of access error with respect to the data disk drives, the first control unit, when the frequency of occurrence of the access error exceeds a predetermined threshold, copying data stored in the data disk drive exceeding the threshold in the spare disk drive via the cache memory, a second control unit provided in the disk adapter for processing an access request directed to the RAID group during copying process by the first control unit, the second control unit making the backup storage take over a write request directed to the RAID group, a third control unit provided in the disk adapter for copying data written in the backup storage by the second control unit to the data disk drives and the spare disk drive other than the data disk drive exceeding the threshold when copying process by the fist control unit is finished.

The channel adapter stores data received from the host device in the cache memory. The channel adapter stores a command (read command, write command) received from the host device in the control memory. The disk adapter makes reference to the contents in the control memory, reads data received from the host device from the cache memory, and stores it in a predetermined data disk drive (in the case where it is a write command).

The disk adapter also makes reference to the contents of the control memory, reads data requested from the host device from the data disk drive, and stores it in the cache memory (in the case where it is a read command). The channel adapter reads the data stored in the cache memory and transmits it to the host device.

Data (including parity) is dispersedly stored in a plurality of data disk drives configuring the RAID group. For example, in the RAID 5, there is no parity-specific disk drive, and thus the parity is also stored dispersedly in the data disk drives as in the case of normal data. The backup storage is provided for processing a write request to the RAID group, and temporarily retains data directed to the RAID group. The backup storage may be implemented, for example, as another RAID group having the same configuration as the RAID group, as one or more logical volumes, or as one or more disk drives.

The first control unit observes occurrence of access errors in the data disk drives configuring the RAID group. The access error includes, for example, data read error and data write error. More specifically, the access error includes, for example, a case in which data could not be written due to scratches on the disk surface, a case in which data could not read due to deterioration of magnetization on the disk surface, and a case in which data could not be written or read due to failure or deterioration of a head. The first control unit observes occurrence of the access error for the data disk drives. When the frequency of occurrence of the access error exceeds a threshold, the first control unit copies data stored in the data disk drive in which the access error exceeding the threshold is detected to the spare disk drive. What should be noted here is that even when the access error exceeds the threshold, the failure that disables writing and reading is not necessarily occurred. Therefore, the first control unit can read data directly from the data disk drive in which the access error exceeding the threshold is detected and transfer it to the spare disk drive. When the data cannot be read directly from the data disk drive in which the access error exceeding the threshold is detected, the first control unit can take data and parity out from another normal data disk drive and recover the data, and then store the recovered data in the spare disk drive.

Even the first control unit is in the course of copying process to the spare disk drive, the host computer using the disk array system can access the RAID group to read or write desired data. When a write request directing to the RAID group is issued during copying process of the first control unit, the second control unit redirects the write request to the backup storage. In other words, new data is not stored in the data disk drives which configures the RAID group, but stores in the backup storage. Then, when the copying process of the first control unit is finished, the third control unit copies and copies the data stored in the backup storage to the data disk drives and the spare disk drives other than the data disk drive in which the access error exceeding the threshold is detected.

There is a case in which a data read request is issued to the data disk drives configuring the RAID group while the first control unit is in the course of copying into the spare disk drive. When a read request is issued to the data disk drive in which the access error exceeding the threshold is detected, the second control unit can recover the requested data from data stored in the data disk drives other than the data disk drive exceeding the threshold. The second control unit provides the recovered data to the source of the read request.

In contrast, when a read request is issued to the respective data disk drive other than the data disk drive in which the access error exceeding the threshold is detected, the second control unit can read data stored in the backup storage and provide the read-out data to the source of the read request.

Referring now to FIG. 1 to FIG. 29, embodiments of the present invention will be described. The present embodiment is characterized as shown below.

According to one configuration, the second control unit processing an access request while transferring data to the spare disk drive is associated with differential management information for controlling data written in the backup storage. The second control unit determines a storage area corresponding to the read request from the host computer based on the differential management information. When reading of data stored in the differential management information is requested, the second control unit reads the requested data from the backup storage and provides it to the host computer. In contrast, when reading of data which is not recorded in the differential management information is requested, the second control unit recovers the data based on data stored in the data disk drives other than the data disk drive exceeding the threshold, and provides the recovered data to the host computer.

In one configuration, the second control unit makes only the write request directed to the data disk drive in which the access error exceeding the threshold is detected out of write requests directed to the RAID group executed by the backup storage. When it is the write request to the data disk drives other than the data disk drive in which the access error exceeding the threshold is detected, the second control unit makes it executed by the corresponding data disk drive.

In one configuration, the second control unit redirects the write request directed to the RAID group to the backup storage when the space more than a predetermined value is left in the backup storage. When there is no space more than the predetermined value in the backup storage, the second control unit makes the RAID group execute the write request directed to the RAID group.

In one configuration, the first control unit recovers data in the data disk drive in which an access error exceeding the threshold is detected based on data stored in the data disk drives other than the data disk drive in which the access error exceeding the threshold is detected. The first control unit makes the recovered data copied in the spare disk drive.

In one configuration, there is provided a manual instruction unit for making the copying process controlled by the first control unit executed manually. In other words, even when an access error does not reach the predetermined threshold, the system administrator can make the contents stored in any one of the data disk drives configuring the RAID group copied in the spare disk drive via the manual instruction unit.

In one configuration, the first control unit and the second control unit can perform multiple operations. The backup storage is adapted to receive a plurality of write requests directing to the data disk drives in the RAID group.

For example, the present embodiment may be considered to be a method of avoiding failure of the disk array system. In other words, the present embodiment is a method of avoiding failure of the disk array system including a plurality of data disk drives configuring the RAID group, at least one spare disk drive provided as a spare for each the data disk drive, and the backup storage provided separately from the data disk drives and the spare disk drive, including a first step to a fifth step shown below. In the first step, occurrence of an access error with respect to the data disk drives is observed and whether or not the frequency of occurrence of the access error exceeds a predetermine threshold is judged. In the second step, when the data disk drive exceeding the threshold is detected in the first step, data stored in the data disk drive exceeding the threshold is copied to the spare disk drive. In the third step, the RAID group and the backup storage are associated by starting copying process in the first step. In the fourth step, whether or not an access request directed to the RAID group has issued is judged. In the fifth step, when issue of the access request is detected in the fourth step and if the access request is the write request, data is written in the backup storage associated in the third step.

In addition, the present embodiment may be considered to be a method of using the disk drive in the disk array system. In other words, the present embodiment is a method of using the disk drive in the disk array system including a plurality of disk drives configuring the RAID group and includes the following steps. In a faulty drive detecting step, occurrence of an access error with respect to the data disk drives configuring the RAID group is observed, and when the frequency of the access error exceeds a predetermined threshold is detected, it is determined that it is a faulty disk drive. In a data copying step, when the faulty disk drive is detected in the fault disk drive detecting step, data stored in the faulty disk drive is copied to a normal disk drive different from the data disk drives configuring the RAID group. In an access request detecting step, whether or not an access request directed to the RAID group has issued during copying process in the data copying step is detected. In an access processing step, when a write request is detected in the access request detecting step, data relating to the write request is written to a normal disk drive different from the normal disk drive in which the data is copied.

1. First Embodiment

Referring to FIG. 1 to FIG. 9, an embodiment of the present invention will be described. FIG. 1 is a schematic block diagram showing a configuration of a disk array system 10.

The disk array system 10 is connected to a plurality of host computers 1 via a communication network CN1 so as to be capable of communicating with each other in both directions. The communication network CN1 here includes, for example, LAN (Local Area Network), SAN (Storage Area Network), and Internet. When using the LAN, data transfer between the host computer 1 and the disk array system 10 is executed according to TCP/IP (Transmission Control Protocol/Internet Protocol) protocol. When using the SAN, the host computer 1 and the disk array system 10 perform data transfer according to a fiber channel protocol. When the host computer 1 is a main frame, data transfer is performed according to the communication protocol, such as FICON (Fibre Connection: Registered Trademark), ESCON (Enterprise System Connection: Registered Trademark), ACONARC (Advanced Connection Architecture: Registered Trademark), or FIBARC (Fiber Connection Architecture: Registered Trademark).

The each host computer 1 is implemented, for example, as a server, a personal computer, a workstation, or a main frame. For example, the each host computer 1 is connected to a plurality of client terminals located out of the drawing via a separate communication network. The each host computer 1 provides a service to each client terminal by writing/reading data to/from the disk array system 10 according to a request from each client terminal.

The disk array system 10 includes channel adapters (hereinafter referred to as CHA) 11, disk adapters (hereinafter referred to as DKA) 12, a shared memory 13, a cache memory 14, a switch unit 15, and disk drives 16, which will be described respectively later. The CHA 11 and the DKA 12 are implemented by cooperation between a printed board on which a processor or a memory is mouthed, and a control program.

The disk array system 10 is provided with a plurality of, for example, four or eight CHAs 11. The channel adapter 11 is provided according to the type of the host computer 1, such as a CHA for open system, or a CHA for main frame system. The each CHA 11 controls data transfer with respect to the host computer 1. The each CHA 11 is provided with a processor unit, a data communication unit, and a local memory unit (not shown).

The each CHA 11 receives a command and data for requesting writing/reading of data to/from the host computer 1 connected respectively thereto, and operates according to the command received from the host computer 1. The operation including the operation of the DKA 12 will now be described. For example, upon reception of data read request from the host computer 1, the CHA 11 stores the read command in the shared memory 13. The DKA 12 makes reference to the shared memory 13 as needed and, when an unprocessed read command is found, reads data from the disk drive 16 and stores it in the cache memory 14. The CHA 11 reads data transferred to the cache memory 14, and transmits it to the host computer 1 which is the source of the command. Alternatively, upon reception of a data write request from the host computer 1, the CHA 11 stores the write command in the shared memory 13, and stores received data in the cache memory 14. The DKA 12 stores the data stored in the cache memory 14 to a predetermined disk drive 16 according to the command stored in the shared memory 13.

In the disk array system 10, a plurality of, for example, four or eight DKAs 12 are provided. The each DKA 12 controls data communication with respect to each disk drive 16, and includes a processor unit, a data communication unit, and a local memory (not shown). The each DKA 12 and the each disk drive 16 are connected via the communication network CN2, such as the SAN, and perform data transfer in blocks according to the fiber channel protocol. The each DKA 12 observes the state of the disk drive 16 as needed, and the result of such observation is transmitted to the SVP 2 via an internal network CN3.

The disk array system 10 is provided with a plurality of disk drives 16. The disk drive 16 is implemented as a hard disk drive (HDD) or a semiconductor memory device, for example. Here, for example, a RAID group 17 may be configured of four disk drives 16. The RAID group 17 is a disk group implementing a redundant storage of data according, for example, to a RAID 5 (not limited to RAID 5). At least one logical volume 18 (LU) which is a logical storage area, may be set on a physical storage area provided by each RAID group 17.

The shared memory 13, which is an example of "control memory" is configured, for example, of a non-volatile memory, and stores control information or management information. The cache memory 14 mainly stores data.

An SVP (Service Processor) 2 is a computer device for managing and observing the disk array system 10. The SVP 2 collects various environment information or performance information from each CHA 11 and each DKA 12 via the communication network CN3 provided in the disk array system 10. Information that the SVP 2 collects includes, for example, a system structure, a power source alarm, a temperature alarm, and an I/O speed (IOPS). The communication network CN3 is configured, for example, as the LAN. The system administrator can perform setting of the RAID configuration, blocking process of various packages (CHA, DKA, disk drive, etc.) via a user interface provided by the SVP2.

FIG. 2 is a schematic explanatory drawing showing the configuration of a RAID configuration management table T1 stored in the disk array system 10. The RAID configuration management table T1 is stored, for example, in the shared memory 13. The RAID configuration management table T1 coordinates, for example, the RAID group number (Group # in the drawing), the logical volume number (Volume # in the drawing), the disk drive number (Disk # in the drawing), and the RAID level with respect to each other. Although other tables shown below is also the same, characters or values shown in the table are intended to make description easier, and are different from those actually stored. An example of the content of the RAID configuration management table T1 will now be described. For example, in the RAID group 17 of the group number 1, three logical volumes 18 in total from the volume numbers 1 to 3 are set. The RAID group 17 is configured of total four disk drives 16 specified by the disk numbers 1 to 4. The RAID group 17 specified by the group number 1 is operated by the RAID 5.

In the present embodiment, as described later, when the sign of occurrence of failure in a certain disk drive 16 is detected, data writing to the RAID group to which the disk drive 16 where occurrence of a failure is anticipated belongs is backed up by another RAID group (or logical volume or disk drive).

Figure 2A:
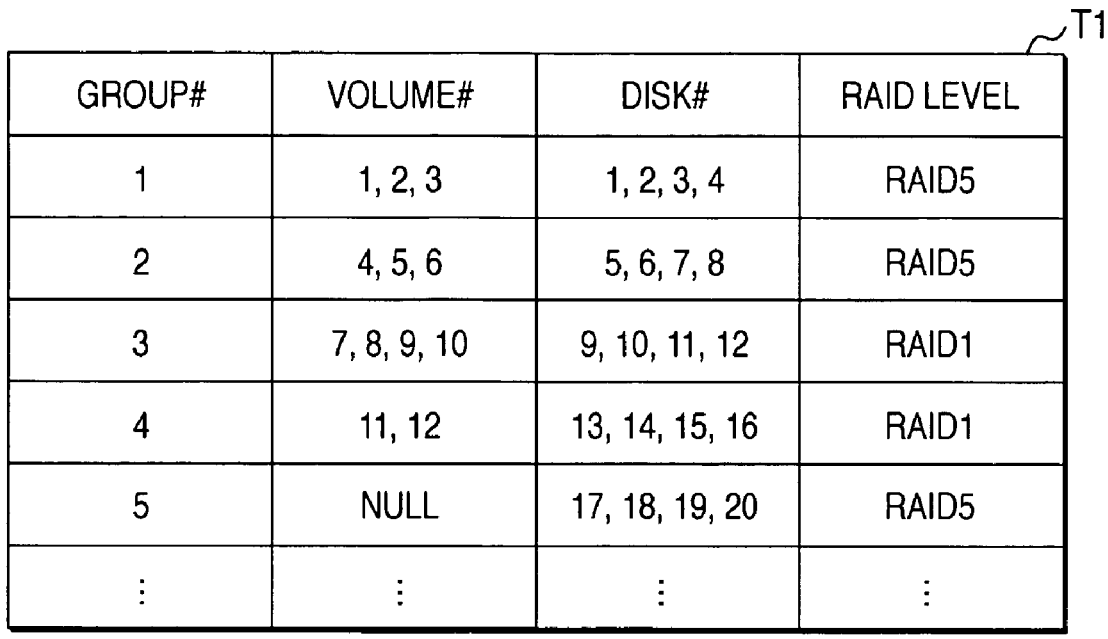
FIG. 2A shows a state before execution of a sparing process.
Figure 2B:
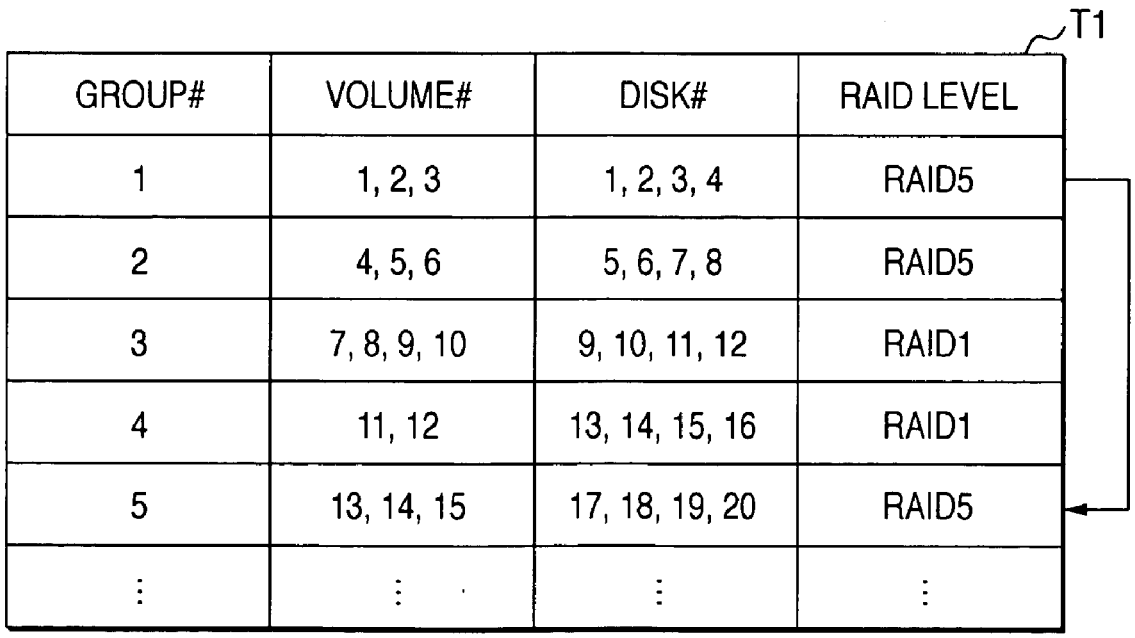
FIG. 2B is a state after execution of the sparing process.

FIG. 2A shows a configuration before setting the RAID group 17 for backup, and FIG. 2B shows a configuration after setting the RAID group 17 for backup. As shown in FIG. 2A, no intended use is set to the RAID group 17 specified by the group number 5, and thus no logical volume is set at the beginning. When occurrence of failure is anticipated in any one of disk drives 16 belonging to the RAID group 17 of the group number 1, the unused RAID group 17 specified by the group number 5 is used as the RAID group 17 for backup. To the RAID group 17 (#5) used for data backup, the same number of logical volumes (#13–15) as the logical volumes 18 (#1–3) which is set to the original RAID group 17 (1#) is set.

FIG. 3 is a schematic explanatory drawing showing the configuration of a pairing information management table T2 stored in the disk array system 10. The pairing information management table T2 is to be stored in, for example, the shared memory 13, and controls the logical volumes 18 constituting the pair.

The pair information management table T2 coordinates, for example, the primary volume number, the secondary volume number, the pairing status, and the differential bitmap with respect to each other. The pairing information management table T2 shown in FIG. 3A shows a state before setting the logical volumes 18 for data backup. In FIG. 3A, for example, a certain logical volume 18 (#4) is paired as a main side with another logical volume 18(#7) as a sub side. The pairing status is "duplex". The "duplex" means to synchronize the contents stored in the primary volume and the secondary volume. The differential bitmap, which will be further described later, is information for managing the differential of data between the primary volume and the secondary volume.

FIG. 3B shows a case in which the RAID group 17 for data backup is set. The respective logical volumes 18 (#1–3) of the RAID group 17 (#1) are coordinated with the respective logical volumes 18 (#13–15) set to the RAID group 17(#5) one-to-one. In other words, in the example shown in FIG. 3B, the logical volume 18(#1) pairs with the logical volume 18(#13), the logical volume 18 (#2) pairs with the logical volume 18 (#14), and the logical volume (#3) pairs with the logical volume 18(#15). The paired states of these pairs are not "DUPLEX", but "UPDATE DATA BEING BACKED UP". The "UPDATE DATA BEING BACKED UP" means a state in which update data originally directed to the logical volumes 18 (#1–3) is being backed up to the logical volume 18 (#13–15) which is the destination of the data backup. The state of "UPDATE DATA BEING BACKED UP" and the state of "DUPLEX" differ from each other in that an initial copying process is not performed. In the normal duplication, the initial copying process is first performed to match the contents of the primary volume and of the secondary volume. However, in the state of "UPDATE DATA BEING BACKED UP", the initial copying process is not performed.

Figures 4A, 4B:
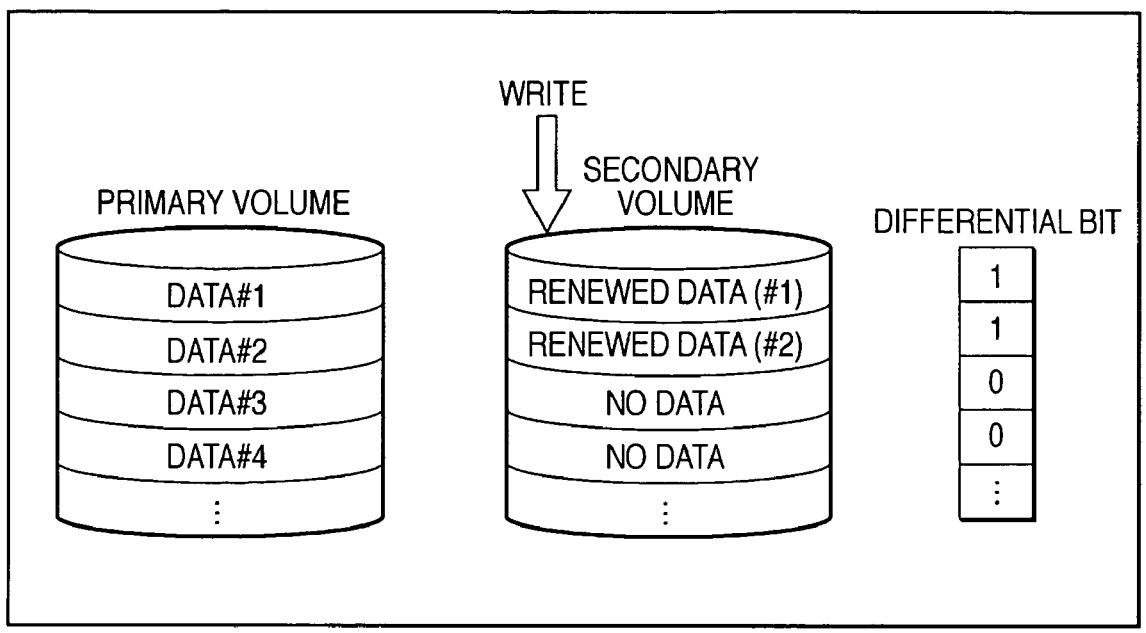
FIG. 4 is an explanatory drawing showing a configuration of a differential bitmap.

FIG. 4 is an explanatory drawing showing a differential bitmap 20. In the present embodiment, as shown in FIG. 4A, the primary volume pairs with the secondary volume, and when data writing (update) to the primary volume is requested, this data is stored in the secondary volume. Assuming that data (#1) and data (#2) are updated, these data are stored in the secondary volume. Then, the differential bits corresponding to the update data are set to "1", respectively. The state in which "1" is set to the differential bit means that data in the secondary volume is not copied to the primary volume, in other words, that new data is stored in the secondary volume. Therefore, when data reading is requested and if the differential bit corresponding to the requested data is set to "1", it can be determined that the data is stored in the secondary volume. In contrast, when the differential bit corresponding to the data to be read is set to "0", it can be determined that the requested data is stored in the primary volume.

As shown in FIG. 4B, the differential bitmap 20 is an aggregation of the differential bits. The differential bit map 20 is an example of "differential management information". In the present embodiment, the respective differential bits correspond respectively to the respective trucks in the disk. Therefore, the update management unit is "truck". When update of data which does not reach the update management unit is performed, all data in the truck to which the update data belongs is read into the cache memory 14, and is combined with the update data on the cache memory 14. The truck combined on the cache memory 14 is stored in the secondary volume and the corresponding differential bit is set to "1".

FIG. 5 is a schematic explanatory drawing showing a method of avoiding failure according to the present embodiment. In an example shown in FIG. 5, it is assumed that occurrence of failure in the fourth disk drive 16 (#4) belonging to the RAID group 7(P) is anticipated. Though it is described in detail later, when read error or write error occurred in a disk drive exceeding the threshold, it is judged that there is a risk of occurrence of failure in the disk drive 16(#4). Therefore, the contents stored in the disk drive 16 (#4) in which occurrence of failure is anticipated is read out to the cache memory 14 first, and then copied from the cache memory 14 to the spare disk drive 16 (SP)(S1).

When data copy to the spare disk drive 16 (SP) is started, an unused RAID group is reserved out of a plurality of RAID groups 17 in the disk array system 10 (S2). Then, the RAID group 17(P) including the disk drive 16 (#4) in which the occurrence of failure is anticipated is paired as a main side with the unused RAID group 17(S) reserved in the step S2 as a sub side. A primary volume 18 (P) set to the main RAID group 17(P) and a secondary volume 18(S) set to the sub RAID group 17(S) constitute a pair (S3). Information on such pairing is registered in the pairing information management table T2.

When data writing is requested from the host computer 1 during data transfer to the spare disk drive 16(SP), the data is stored not in the primary volume 18(P), but in the secondary volume 18(S)(S4). When the data is stored in the secondary volume 18(S), the differential bit corresponding to the update data is set to "1", and managed by the differential bitmap 20 (S5).

When data writing is requested from the host computer 1 during data transfer to the spare disk drive 16 (SP), DKA12 makes reference to the differential bitmap 20 and determines in which one of the primary volume 18(P) and the secondary volume 18(S) the data requested from the host computer 1 is stored. When the differential bit corresponding to the requested data is set to "0", the requested data is stored in the primary volume 18(P). Then, the DKA12 reads the requested data from the primary volume 18(P), and copies it in the cache memory 14. The CHA 11 transmits data which is transferred to the cache memory 14 to the host computer 1 (S6). On the other hand, when the differential bit corresponding to the data requested by the host computer 1 is set to "1", the requested data exists in the secondary volume 18(S). Then the DKA 12 reads the requested data from the secondary volume 18(S) and copies it to the cache memory 14. As described above, the CHA 11 transmits the data transferred to the cache memory 14 to the host computer 1 (S7).

When data transfer to the spare disk 16(SP) is completed, the DAK 12 makes reference to the differential bitmap 20 and copies data backed up in the secondary volume 18(S) to the primary volume 18(P)(S8). More specifically, the data stored in the secondary volume 18(S) is copied to the disk drives 16 (#1–3) other than the disk drive 16(#4) in which failure is anticipated, and to the spare disk drive 16(SP) out of the disk drive 16 belonging to the main RAID group 17(P). Although it is needless to say, not all the data stored in the secondary volume 18(S) is copied to the disk drives 16 (#1–3) and the spare disk drive (SP) respectively. Only the necessary data is copied to the corresponding disk.

Figure 6:
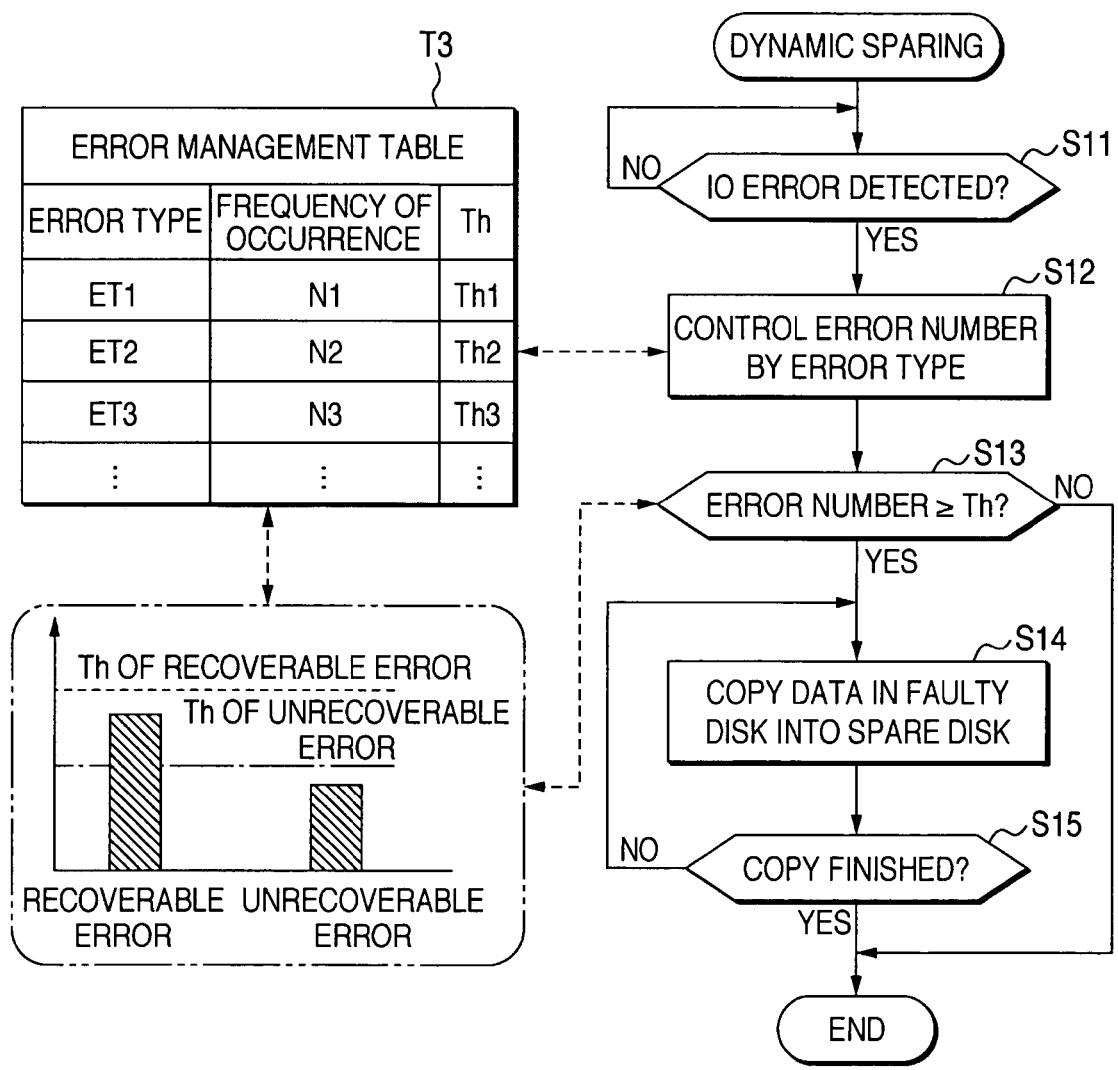
FIG. 6 is a flowchart showing the sparing process.

Subsequently, referring to FIG. 6, a copying process to the spare disk drive 16(SP) shown in S1 in FIG. 5 will be described. In the present embodiment, data copy to the spare disk drive 16(SP) may be referred to as "sparing". The flowchart shown in FIG. 6 shows an example of a "first control unit", a "first step", and a "second step", a "faulty drive detecting step", and a "data copying step". Process shown in FIG. 6 is executed by the DKA 12. Each flowchart shows the outline of the process, and differs from the actual computer program, which is the same for the respective flowcharts shown later.

The DKA 12 observes access error (I/O error) in each disk drive 16 (S11). When occurrence of error is detected (YES in S11), the DKA 12 controls the number of occurrences of error for each type of error (S12). The DKA 12 can control the access error occurred by using an error management table T3 shown in FIG. 6. The number of occurrences of access error (N1–N3 . . . ) is controlled by each type (ET1–ET3 . . . ), and thresholds Th1–Th3 . . . are set to the respective types of access error. Although there is only one error control shown in FIG. 6, the error control is performed for the each disk drive 16 being used.

The access error can be classified, for example, into read errors and write errors. The access error can also be classified, for example, into recoverable errors and unrecoverable errors. The recoverable error means an error of the type that recovery of data can easily be achieved by ECC (Error-Correcting Code). The unrecoverable error means an error of the type that cannot be recovered by the redundant data (ECC) attached to each data and hence must be recovered at the higher level (inverse operation using other data and parity). Detailed examples of the access error include, for example, a case in which data cannot be written due to existence of physical scratches on the disk surface, a case in which data cannot be read because magnetism on the disk surface is deteriorated, and a case in which data cannot be read and written due to failure of a magnetic head.

As shown on the lower side of the error management table T3, the thresholds Th are different between the recoverable error and the unrecoverable error. The threshold Th of the recoverable error is set to a relatively high value, and the threshold Th of the unrecoverable error is set to a relatively low value. Although at least three errors are shown and threshold Th are set for each types of errors in the error management table T3 in FIG. 6, it is only shown byway of example, and it is possible to limit only two types of errors; the recoverable error and the unrecoverable error. Alternatively, it is also possible to classify the error in further detail and set thresholds Th to a number of types of errors, respectively as shown in the error management table T3.

The DKA 12 makes reference to the error management table T3 and judges whether or not the frequency of occurrence of the access error exceeds the threshold Th for each of the disk drives 16 which is being used (S13). When the frequency of occurrence of the access error does not exceed the threshold Th (NO in S13), the process is terminated. On the other hand, when the frequency of occurrence of the access error exceeds the threshold Th (YES in S13), it means that occurrence of failure is anticipated in the corresponding disk drive 16. Then, the DKA 12 copies the contents stored in the disk drive that occurrence of failure is anticipated (hereinafter, this drive may be referred to as faulty drive) 16 into the spare disk drive 16 (SP), and starts data transfer (S14). The procedure in S14 is repeated until data transfer is completed (NO in S15). When data transfer to the spare disk drive 16 (SP) is completed (YES in S15), the processing is terminated.

In the processing described above, the threshold Th is set to each error type, and the disk drive is judged to be a faulty disk drive when the frequency of occurrence of the access error of any type exceeds the corresponding threshold Th. However, the invention is not limited thereto, and it is also possible to judge whether or not it is a faulty disk drive by totally analyzing the access error (based on the access error).

Figure 7:
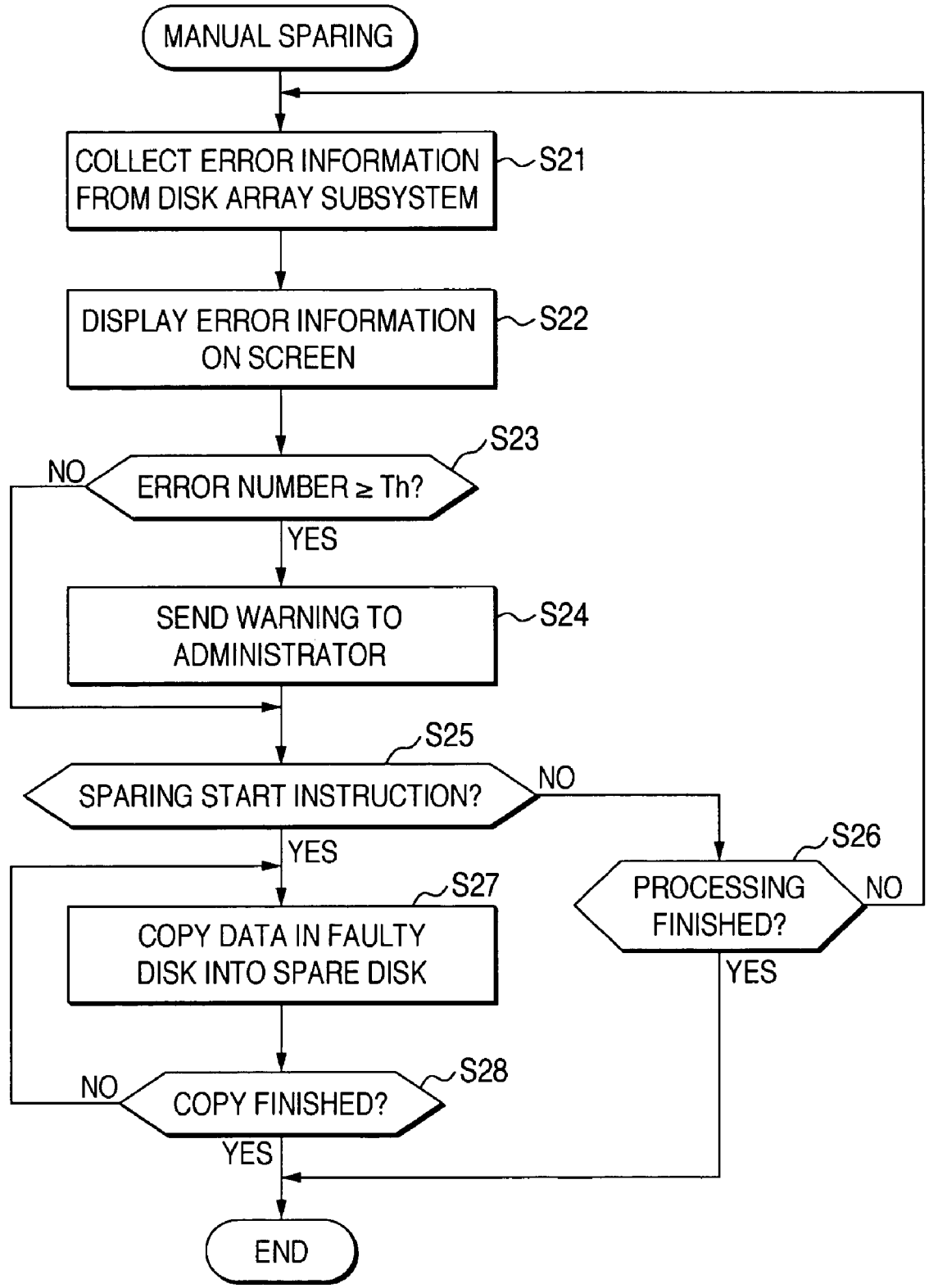
FIG. 7 is a flowchart showing a procedure of manual sparing process.

FIG. 7 shows a processing in a case in which sparing is implemented manually via a SVP 2. The procedure shown in FIG. 7 is executed mainly by the cooperation of the SVP 2 and the DKA 12. This procedure includes a configuration corresponding to the "manual instruction unit".

The SVP 2 collects error information relating to the respective disk drives 16 from the respective DKAs 12 via the internal network CN3 (S21). The SVP 2 displays the collected error information on the terminal screen of the SVP 2 depending on the request from the system administrator, or automatically (S22). The SVP 2 (more specifically, the control program executed by the microprocessor of the SVP 2) judges whether or not the frequency of occurrence of access error exceeds the threshold. Th for the respective disk drives 16 (S23). When the disk drive 16 in which the frequency of occurrence of access error exceeds the threshold Th is detected (YES in S23), the SVP 2 determines that this disk drive 16 is a faulty disk drive having high risk of occurrence of failure in the future, and sends a warning to the system administrator (S24). This warning may be, for example, a display of a warning message, an audio output, or a flashing of a warning lamp. When there is no disk drive 16 that the frequency of occurrence of access error exceeds the threshold Th (NO in S23), S24 is skipped.

The system administrator can issue an instruction to start sparing according to the warning informed in S24, or even when no warning is made, according to his/her own judgement. Instruction to start sparing via manual operation of the system administrator is performed via the user interface of the SVP 2 (for example input through a keyboard switch or voice instruction). The DKA 12 judges whether or not the instruction to start sparing is issued by the system administrator (S25). When there is no start instruction by manual operation (NO in S25), whether or not the processing is to be terminated is determined (S26). For example, when the system administrator issues instruction to terminate the processing by operating menu or the like (YES in S26), the processing is terminated. When the system administrator does not issue instruction to terminate the processing (NO in S26), the procedure goes back to S21 and collection of error information and so on are repeated.

When the system administrator issues an instruction to start sparing by manual operation (YES in S25), the contents of a disk drive 16 which the system administrator indicated or the disk drive 16 warned in S24, or the disk drive 16 which the system administrator indicated and a warned disk drive 16 are copied in the spare disk drive 16 (SP) (S27). When data transfer to the spare disk drive 16 (SP) is completed (YES in S28), the processing is terminated.

Figure 8:
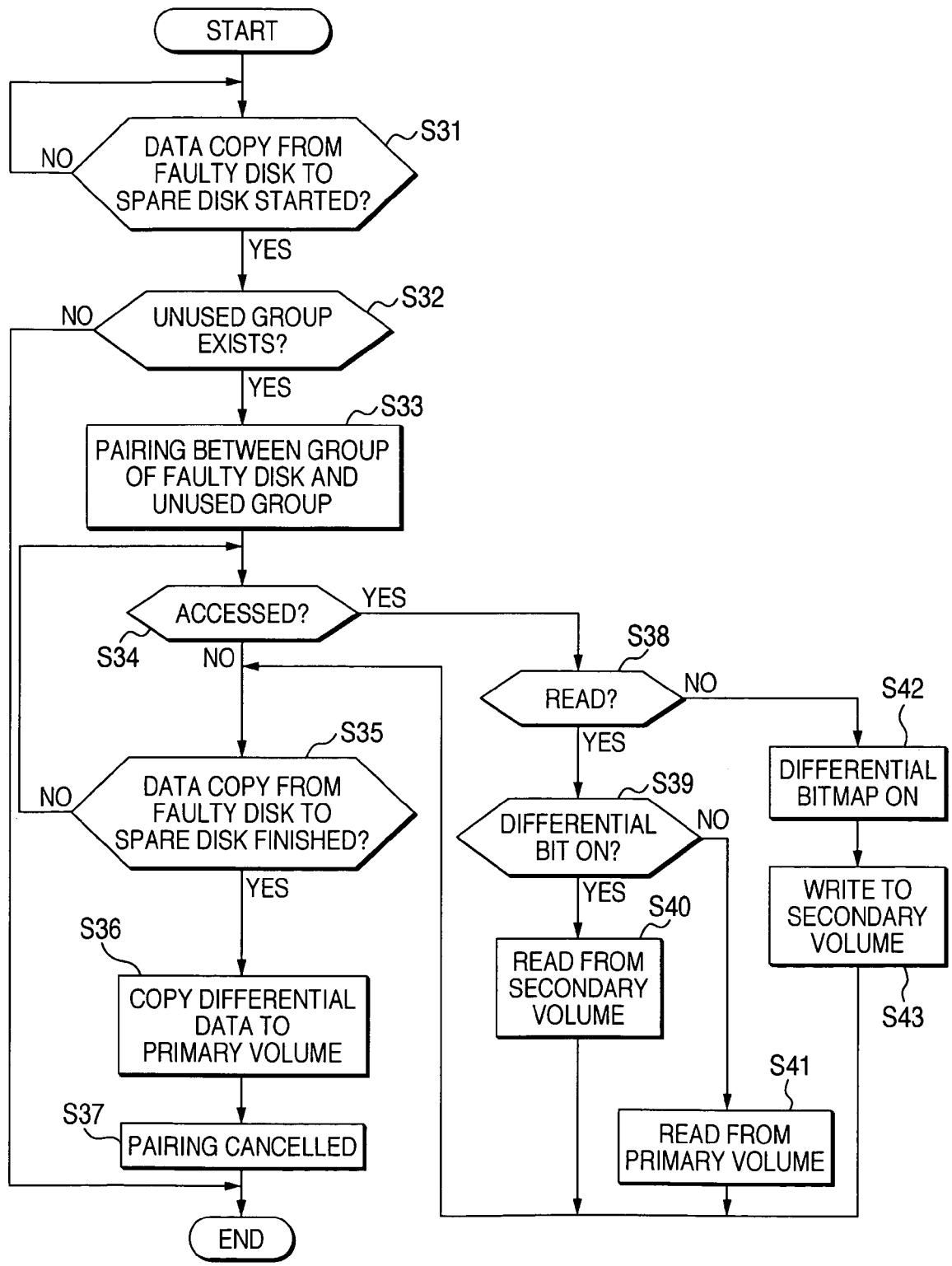
FIG. 8 is a flowchart showing a data backup process.

FIG. 8 is a flowchart showing a data backup process. The data backup process is activated by starting sparing, and is executed by the DKA 12. The processing shown in FIG. 8 is an example corresponding to a "second control unit", "third step" to "fifth step", an "access request detection step" and an "access processing step" respectively.

The DKA 12 observes sparing, that is, whether or not data copy from the faulty disk drive 16 to the spare disk drive 16 (SP) has started (S31). When the start of sparing is detected (YES in S31), the DKA 12 judges whether or not an unused RAID group 17 exists (S32). When the unused RAID group 17 does not exist (NO in S32), the data backup area cannot be reserved, the processing is terminated.

When the unused RAID group 17 is found (YES in S32), the DKA 12 pairs the RAID group 17 including the faulty disk drive 16 as a main side with the found unused RAID group 17 as a sub side (S33). When a plurality of logical volumes 18 are set to the main RAID group 17, the same number and the same size of the logical volume 18 are set to the sub RAID group 17, and the respective logical volumes 18 in the main side and the sub side are paired with each other, respectively.

The DKA 12 makes reference to the shared memory 13 as needed, and observes whether or not an access request (read request or write request) is issued from the host computer 1 (S34). When no access request is issued from the host computer 1 (NO in S34), the DKA 12 judges whether or not the sparing is finished (S35). When sparing is not finished (NO in S35), the procedure goes to S34. When the sparing is finished (YES in S35), the DKA 12 copies data stored in the secondary volume 18 to the primary volume 18 (S36) and deletes the pairing of the volume (S37) and terminates the processing.

When an access request is issued from the host computer 1 during sparing (YES in S34), the DKA 12 judges whether or not the access request is a read request (indicated by READ in the drawing) (S38). When it is the read request (YES in S38), the DKA 12 makes reference to the differential bitmap 20 and judges whether or not the differential bit corresponding to the data requested to be read out is set to the value "1" (in the drawing, the case in which the differential bit is set to 1 is indicated by ON, and the case in which the differential bit is set to "0" is indicated by OFF) (S39).

When the differential bit is set to "1" (YES in S39), the requested data exists in the secondary volume 18. Therefore, the DKA 12 reads data from the secondary volume 18, and stores it in the cache memory 14 (S40). When the differential bit corresponding to the data requested to be read out is set to "0" (NO in S39), since the requested data exists in the primary volume 18, the DKA 12 reads data from the primary volume 18, and stores it in the cache memory 14 (S41). When the requested data is stored in the faulty disk drive 16, data is not read out directly from the faulty disk drive 16, but the requested data is recovered based on data stored in another normal disk drive 16.

When the access request requested from the host computer 1 is a write request (NO in S38), the DKA 12 sets the differential bit corresponding to the data to be written (data to be updated) to "1" (S42), and stores the data to be written into the secondary volume 18 (S43).

Figure 9:
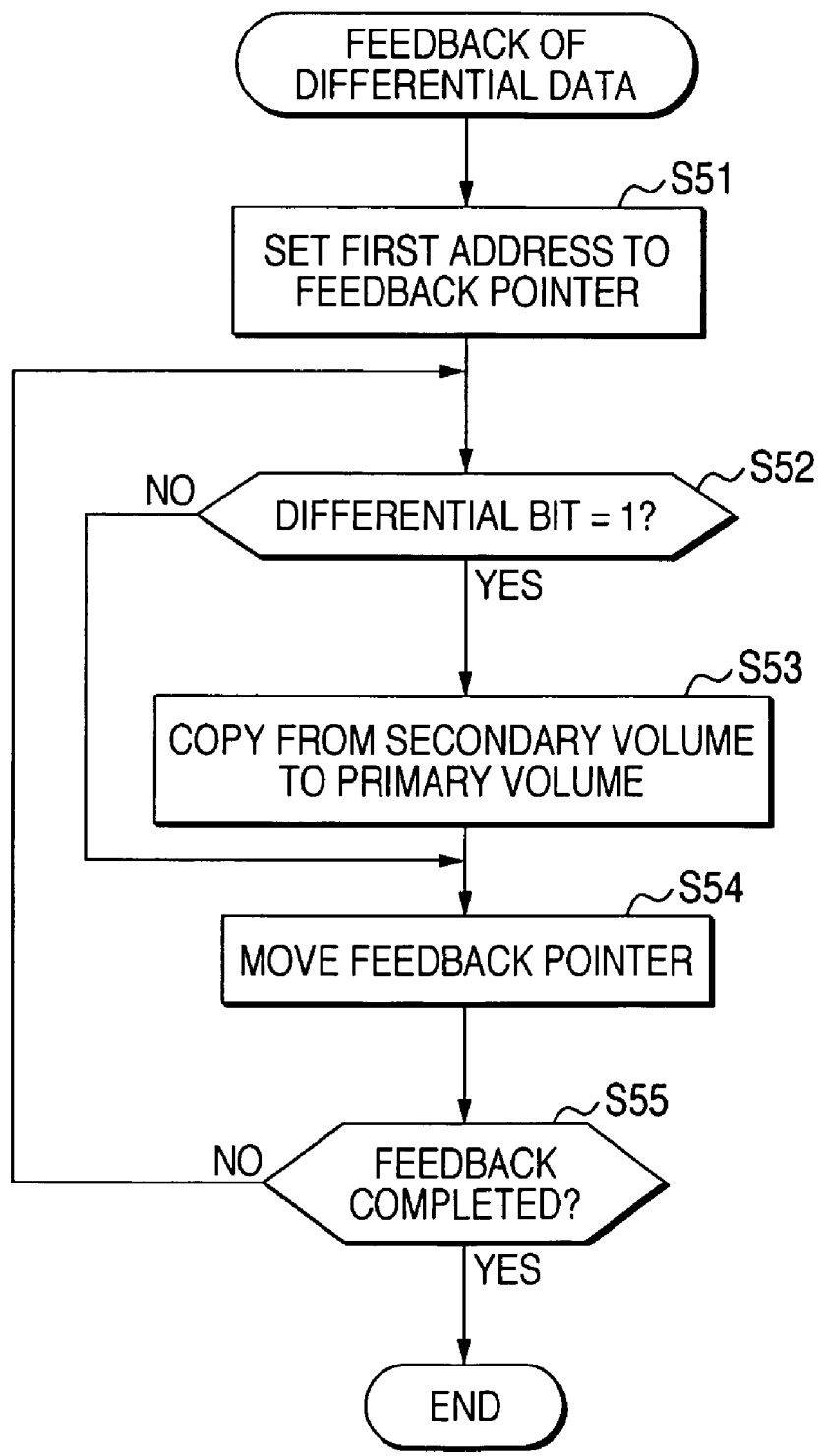
FIG. 9 is a flowchart showing a feedback process of differential data.

FIG. 9 is a flowchart showing a feedback processing of the differential data. The differential data feedback processing is executed by the DKA 12 when the sparing is finished. This processing corresponds to details of S36 in FIG. 8. This processing is an example corresponding to a "third control unit", a "sixth step", a "data update step".

The DKA 12 sets the feedback pointer to the first address of the logical volume (S51). The DKA 12 judges whether or not the differential bit corresponding to the address is set to "1" (S52). When the differential bit is set to "1" (YES in S52), the DKA 12 copies the data of this address from the secondary volume 18 to the primary volume 18 (S53). More specifically, the data read out from the secondary volume 18 is copied to the cache memory 14, and copied from the cache memory 14 to the primary volume 18. When data copy for one address is finished, the DKA 12 moves the feedback pointer to the next address (S54). The DKA 12 then judges whether or not the feedback of the differential data is completed (S55). In other words, the DKA 12 judges whether or not the feedback pointer points the terminal position. The procedure from S52 to S54 is repeated until the feedback of the differential data is terminated (NO in S55).

According to the present embodiment thus configured has following advantages.

Data writing/reading to/from the RAID group 17 including the faulty disk drive 16 may be reduced during data transfer from the faulty disk drive (more accurately, the disk drive in which occurrence of failure is anticipated) 16 to the spare disk drive 16 (SP). Therefore, possibility of occurrence of failure in other normal disk drive 16 constituting the RAID group 17 may be reduced, and hence, the possibility of double-failure may be reduced. In other words, for example, when a set of data set in RAID 5 is considered, even when any one of data configuring the data set is lost, the lost data can be recovered by performing inverse operation from the remaining data (including parity). More specifically, it is assumed that the data set is configured of four data D1–D4 and one parity p. Granted that D2 cannot be read out, the D2 can be obtained by D2=(D1)XOR(D3)XOR(D4)XOR(p). However, when two or more data cannot be used, recovery of data by operation is not possible.

It cannot be said that no error exists in other normal disk drives 16 which is not judged to be faulty disk drives 16. Even when no error exists, the possibility of occurrence of error increases with the increased number of accesses. If the position of error occurred in the normal disk drive 16 corresponds to the position of error in the faulty disk drive 16 by chance, data stored in this position cannot be recovered. Since relatively a large number of errors have already occurred in the faulty disk drive 16, a position of new error occurred additionally to the normal disk drive 16 may correspond by chance to the position of error in the faulty disk drive 16. Such failure caused by correspondence of the error positions is referred as "double failure" in the present embodiment. Therefore, when access to the normal disk drive 16 is continued as usual during sparing, part of data may be lost due to a new error generated in the normal disk drive 16.

In contrast, according to the present embodiment, since access to other normal disk drives 16 is reduced during sparing, possibility of occurrence of double failure by the occurrence of new additional error in other normal disk drives 16 may be reduced. More specifically, according to the present embodiment, data writing during sparing is executed with respect to the secondary volume 18, and data reading during sparing is executed from the primary volume 18 only when the requested data exists in the primary volume 18. Therefore, frequency of access to the primary volume 18 including the faulty disk drive 16 is reduced, and thus occurrence of double failure maybe prevented.

In the present embodiment, data backed up in the secondary volume 18 is controlled by the differential bitmap 20. Therefore, when data read request is issued from the host computer 1, in which one of the primary volume 18 and the secondary volume 18 the requested data exists can easily be determined.

2. Second Embodiment

Figure 10:
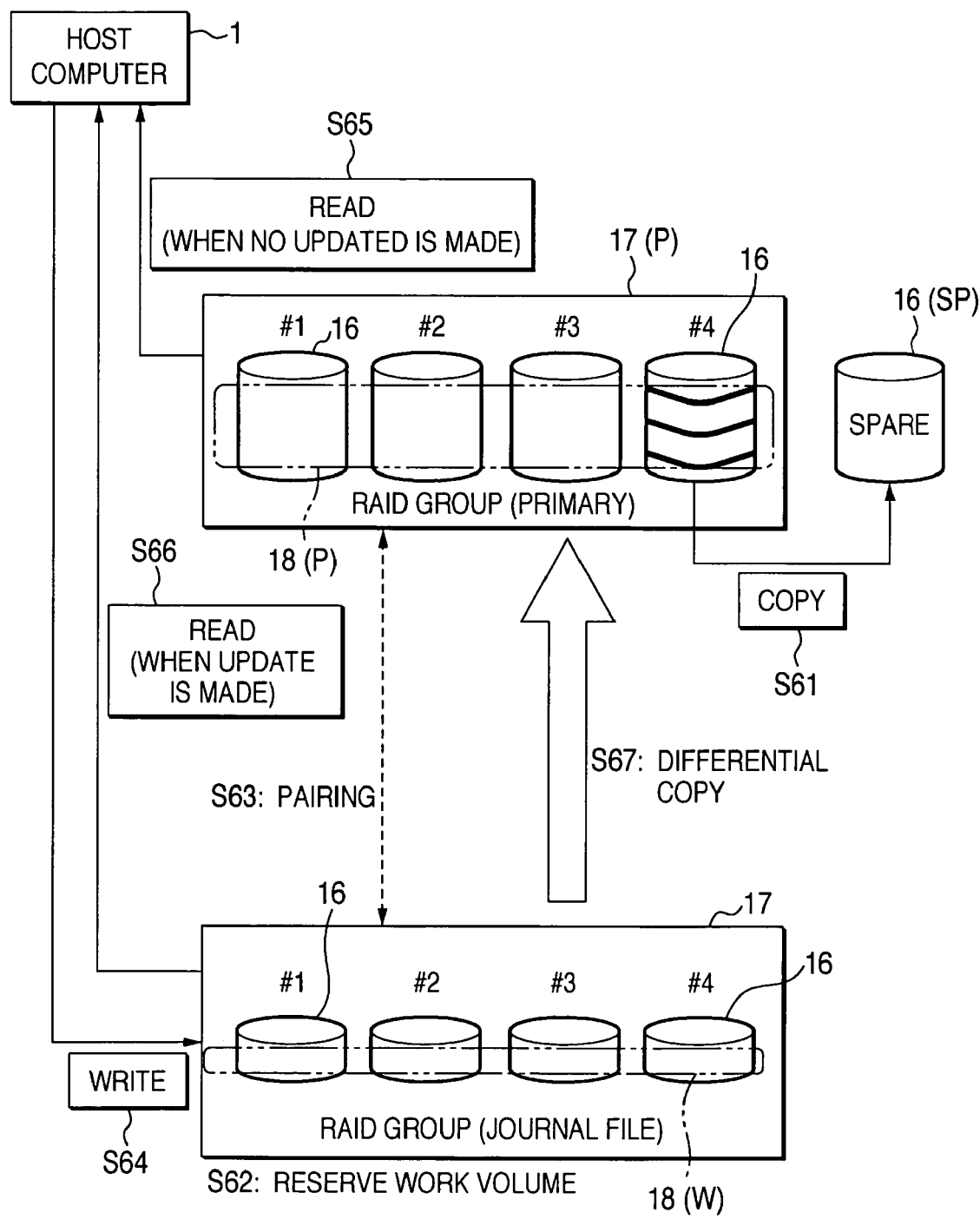
FIG. 10 is a schematic explanatory drawing generally showing a method of avoiding data failure according to a second embodiment.

Referring to FIG. 10 to FIG. 13, the second embodiment of the present invention will be described. A characteristic of the present embodiment is that a logical volume is used as a data backup area during sparing. Another characteristic of the present embodiment is in that a journal file is used. FIG. 10 is an explanatory drawing schematically showing the entire operation of a method of avoiding failure according to the present embodiment. The outline of the entire operation is almost the same as the previous embodiment.

When occurrence of failure is anticipated in a certain disk drive 16, sparing for transferring the contents stored in the disk drive 16 in which occurrence of failure is anticipated into a spare disk drive 16(SP) is started (S61). When the sparing is started, at least one unused logical volume 18 is reserved for a data backup area (S62). This unused logical volume 18 is used as a work volume 18(W). What should be noted here is that the unused logical volume is reserved, but not the unused RAID group of the same size in contrast to the previous embodiment In other words, the size of storage in which the data is originally stored differs from the size of the destination storage, and thus the size of the destination storage used is smaller than the size of the original storage.

The logical volume 18(P) set to the RAID group 17(P), which is the original location, is coordinated with the work volume 18(W) (S63). The logical volume 18(P) and the work volume 18 (W) may have different storage size (may be the same size). When a write request is issued from the host computer 1 to the RAID group 17(P), the update data is stored in sequence to the work volume 18(W) (S64). What should be noted here is that write history is stored in the work volume 18(W) as in the journal file.

When a read request is issued from the host computer 1 to the RAID group 17(P), if the requested data exists in the RAID group 17(P), that is, when it is a read request of data which is not updated, the data is read out from the logical volume 18(P), and is provided to the host computer 1 via the cache memory 14 and CHA 11 (S65). When the requested data exists in the faulty disk drive 16 (#4), the requested data is recovered based on data stored in other disk drives 16(#1–3).

The data requested from the host computer 1 exists in the work volume 18(W), that is, when it is a read request of update data, the data is read out from the work volume 18(W) and is provided to the host computer 1 (S66). When the sparing is finished, the data stored in the work volume 18 (W) is copied to the logical volume 18(P) and the spare disk drive 16(SP)(S67). The differential data is not copied to the faulty disk drive 16 (#4).

FIG. 11 is a schematic explanatory drawing showing a configuration of a work volume management table T4 stored in the disk array system 10. The work volume management table T4 is stored, for example, in the shared memory 13. All the tables including the respective tables described in the previous embodiment may be stored in the storage area other than the shared memory.

Figures 11A, 11B, 11C:
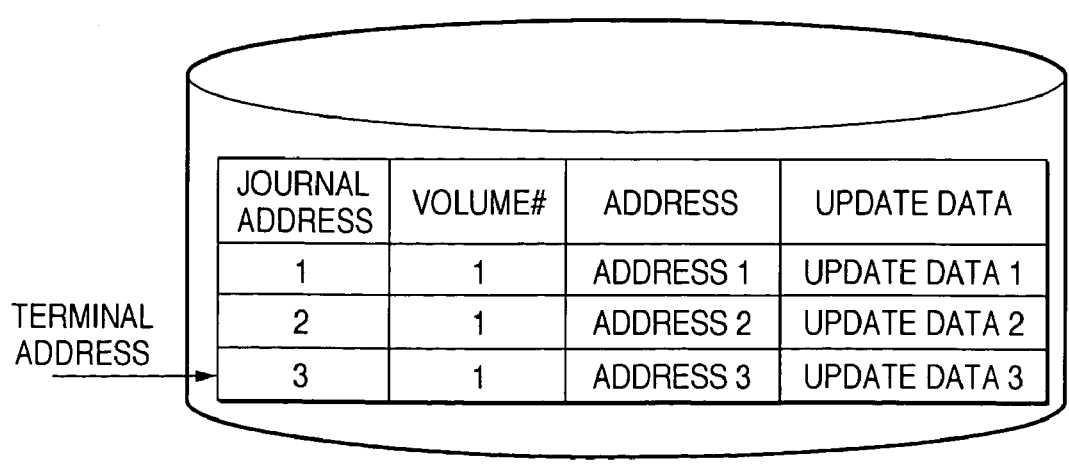
FIG. 11A is a state before execution of the sparing process.
FIG. 11B is a state after execution of the sparing process.
FIG. 11C shows a storage configuration of the work volume.

The work volume management table T4 includes, for example, the work volume number, the storage capacities of work volume, the corresponding primary volume number, the terminal address in which the latest data update is stored, and the differential bit map coordinated with each other. The differential bit map is used for controlling the position of the update data. FIG. 11A shows a state before starting data transfer (sparing process) to the spare disk drive 16(SP). Therefore, none of three work volumes 18(#10–12) are coordinated with the primary volume.

FIG. 11B shows a state after starting sparing process. In this example, the respective work volumes 18(#10–12) are coordinated to each one of the primary volumes 18 (#1–3). However, it may be configured to coordinate one work volume 18 to a plurality of primary volumes 18.

FIG. 11C is a schematic drawing showing data to be stored in the work volume 18. In the work volume 18, for example, there are stored the journal addresses, the primary volume numbers, the address, and the update data, coordinated with each other. In the example shown, data is stored from the top to the bottom in sequence, and the lowermost address is the terminal address.

Figure 12:
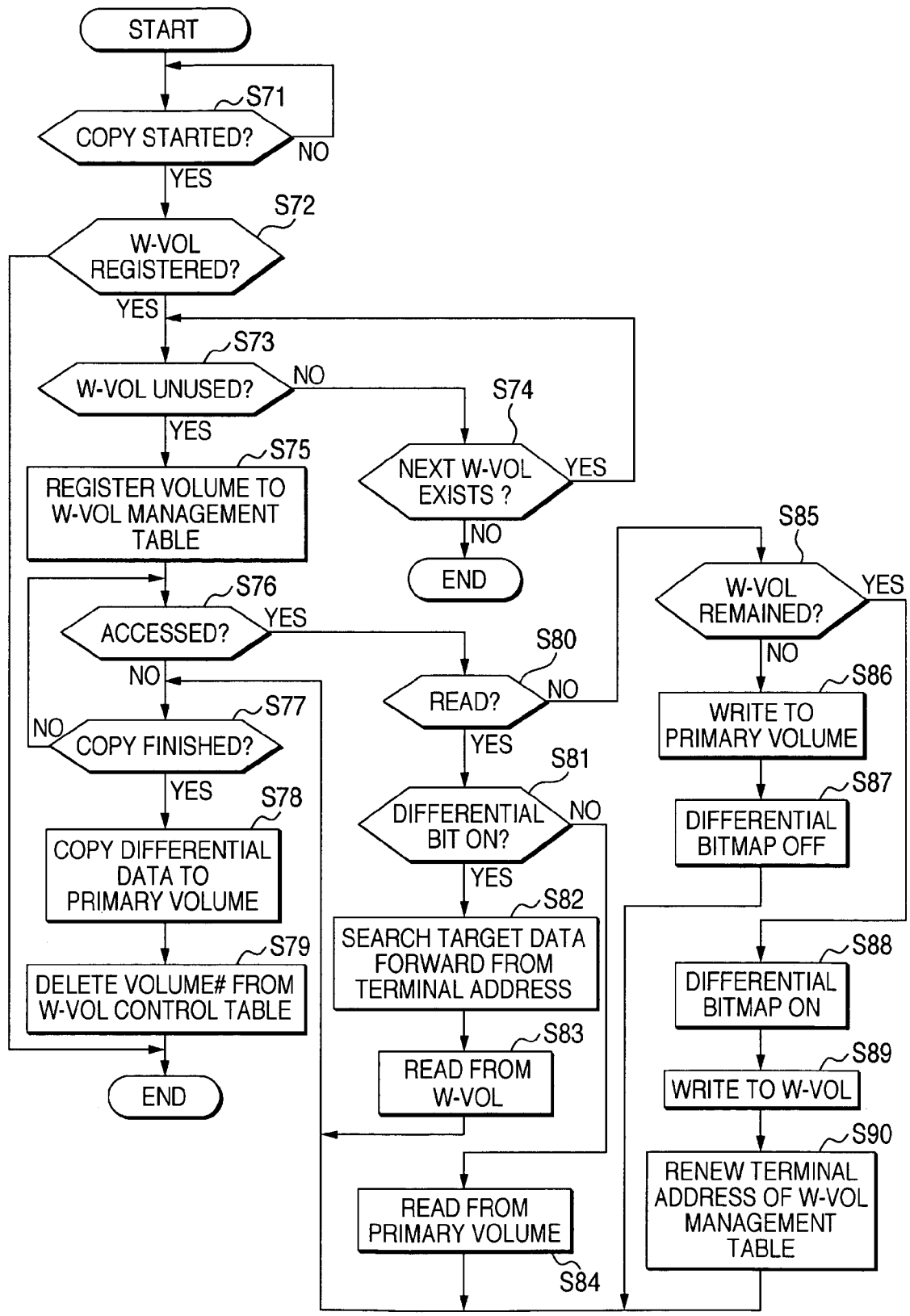
FIG. 12 is a flowchart showing a data backup process.

FIG. 12 is a flowchart showing data backup process. This processing is executed by the DKA 12. Upon detection of the fact that data copy from the faulty disk drive 16 to the spare disk drive 16(SP) is started, the DKA 12 judges whether or not the work volume 18 is registered (S72). When the work volume 18 is not registered (NO in S72), a data backup area cannot be reserved, and thus the processing is terminated.

When the work volume 18 is registered (YES in S72), whether or not the work volume 18 is unused is judged (S73). When the work volume 18 is in use (NO in S73), whether or not there are other work volumes 18 registered is judged (S74). When the registered work volume does not exist (NO in S74), a data backup area cannot be reserved, and thus the processing is terminated. On the other hand, when other work volume 18 is registered (YES in S74), the procedure goes to S73 and whether or not it is the unused work volume 18 is inspected.

In this manner, DKA 12 inspects the registered work volumes 18 in sequence, and detects the unused work volume 18. When the unused work volume 18 is detected (YES in S73), the DKA 12 coordinates the detected unused work volume 18 and the original logical volume 18 of the backupdate and registers it to the work volume management table T4 (S75).

The DKA 12 observes whether or not an access request is issued from the host computer 1 during a period until data transfer to the spare disk drive 16(SP) is completed (S76). When data transfer is completed (YES in S78), the DKA 12 copies data stored in the work volume 18 to the primary volume 18 and the spare disk drive 16(SP)(S78). Then, the DKA 12 deletes the number of primary volume 18 coordinated with the work volume 18 from the work volume management table T4, and releases the work volume 18 used as the data backup area (S79).

When an access request from the host computer 1 is detected in the data transfer period (YES in S76), the DKA 12 judges whether or not the access request is a read request (S80). If it is the read request (YES in S80), making reference to the differential bitmap registered in the work volume management table T4, whether or not the differential bit corresponding to the requested data is set to "1" is judged (S81). When the differential bit is set to "1" (YES in S81), data to be read is stored in the work volume 18. The DKA 12 then searches the journal file stored in the work volume 18 from the terminal address upward (ascending order in time sequence) to find target data (S82). The DKA 12 reads out the found data from the work volume 18 and stores it in the cache memory 14 (S83), and returns to S77. When the differential bit corresponding to the data requested from the host computer 1 to be read out is set to "0" (NO in S81), the DKA 12 reads out the target data from the primary volume 18 and stores it in the cache memory 14 (S84). The CHA 11 reads the data stored in the cache memory 14 and transmits it to the host computer 1.

On the other hand, when the access request from the host computer 1 is a write request (NO in S80), the DKA 12 inspects the remaining space in the work volume 18 (S85). When there is not enough remaining space to store the update data in the work volume 18 (NO in S85), the DKA 12 stores the update data in the primary volume 18 (S86). Then, since the update data is stored in the primary volume 18, the differential bit corresponding to the update data is set to "0" (S87), and the procedure returns to S77. When there is enough remaining space to store the update data in the work volume 18 (YES in S85), the DKA 12 sets the differential bit corresponding to the update data to "1" (S88), and stores the update data to the work volume 18 (S89). Then, the DKA 12 updates the terminal address of the work volume management table T4 (S90), and returns to S77.

When the remaining space in the work volume 18 is running short (NO in S85), as having done in S72 to S74, another work volume 18 having an enough space left therein is searched, and when another work volumes 18 having an enough space left therein are found, the update data may be stored in this work volume 18.

Figure 13:
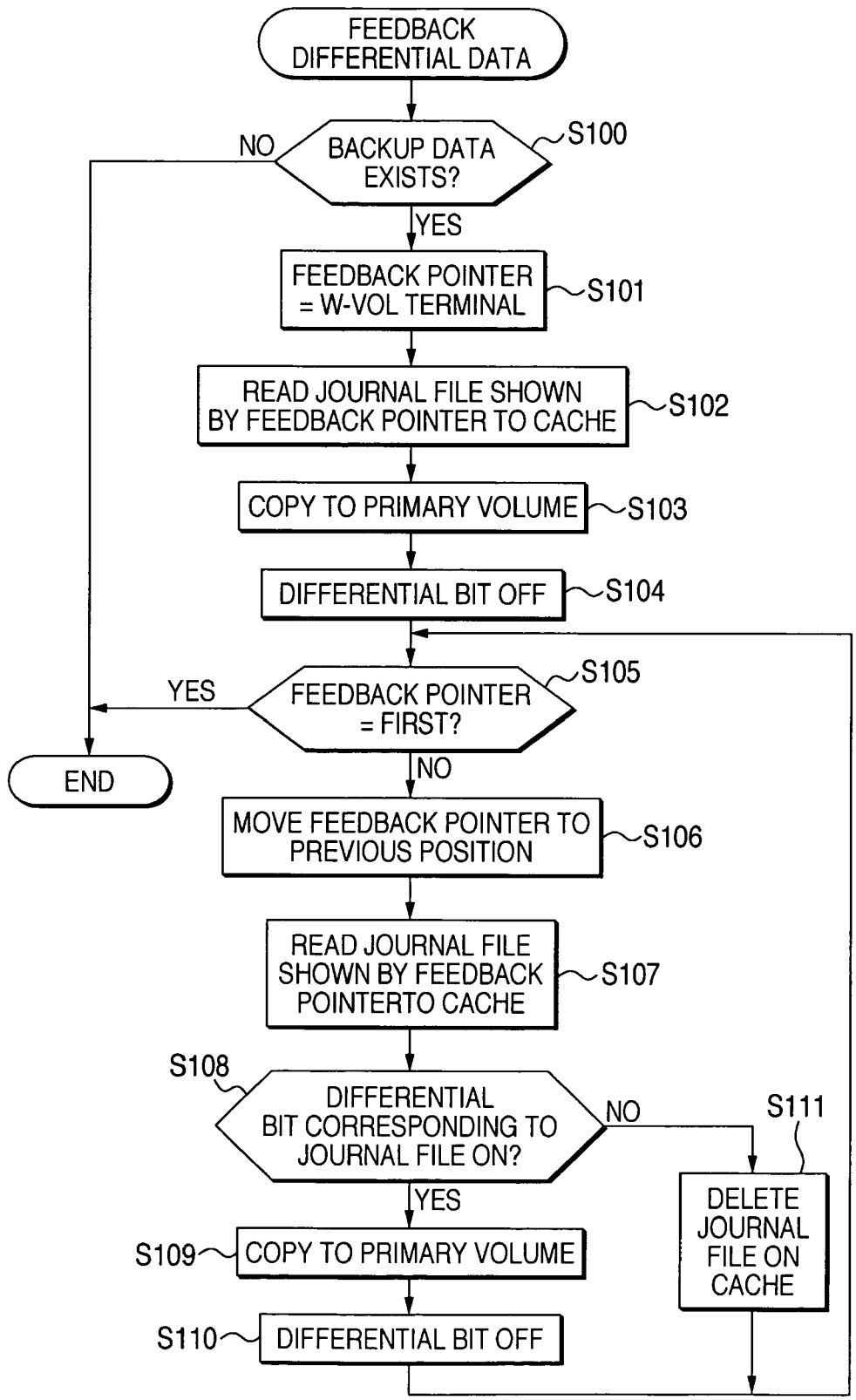
FIG. 13 is a flowchart showing a feedback process of differential data.

FIG. 13 is a flowchart showing a feedback processing of differential data. This processing corresponds to S78 in FIG. 12.

The DKA 12 judges whether or not data backed up in the work volume 18 exists (S100). When the backupdate does not exist (NO in S100), the processing is terminated. When the backupdate exists (YES in S100), the feedback pointer is set to the terminal address in the work volume 18 (S101). In other words, the feedback pointer is set to the latest data. Subsequently, the DKA 12 stores a journal file (update data and address) pointed by the feedback pointer in the cache memory 14 (S102). The DKA 12 copies the update data copied in the cache memory 14 to the primary volume 18 (S103). Here, copying the differential data (update data) to the primary volume 18 means to copy the update data to a predetermined address in other normal disk drives 16 and the space disk drive 16(SP) in the primary volume 18 other than the faulty disk drive 16. This is the same in other embodiments described below.

After copying the update data to the primary volume 18, the DKA 12 sets the differential bit corresponding to the update data to "0" (S104). Subsequently, the DKA 12 inspects whether or not the feedback pointer points the first address (S105). When the feedback pointer reaches the first address of the work volume 18 (YES in S105), it means that the entire work volumes 18 is inspected and data transfer is completed, and thus the DKA 12 terminates the processing.

When the feedback pointer does not reach the first address (NO in S105), the DKA 12 moves the feedback pointer one data backward (to the older data) (S106). Then, the DKA 12 reads the update data shown by the feedback pointer from the journal file and stores it in the cache memory 14 (S107). The DKA 12 judges whether or not the differential bit corresponding to the update data read out to the cache memory 14 is set to "1". (S108). When the differential bit is set to "1" (YES in S108), the DKA 12 copies the update data to the primary volume 18 (S109), the differential bit is changed from "1" to "0" (S110), and the procedure goes to S105. On the other hand, when the differential bit corresponding to the update data read out to the cache memory 14 is set to "0" (NO in S108), the DKA 12 deletes data read out to the cache memory 14 (S111) and the procedure goes to S105.

On the other hand, in the step from S105 to S111, data is copied to the primary volume 18 from the newer journal file in sequence and the differential bit is set to "0" in order to prevent the new data from being overwritten by data in the older journal file. Data in which the differential bit is set to "0" is determined to be an old data, and is deleted.

3. Third Embodiment

Referring now to FIG. 14 to FIG. 18, a third embodiment will be described. A characteristic of the present embodiment is that a work disk is used as a data backup area.

Figure 14:
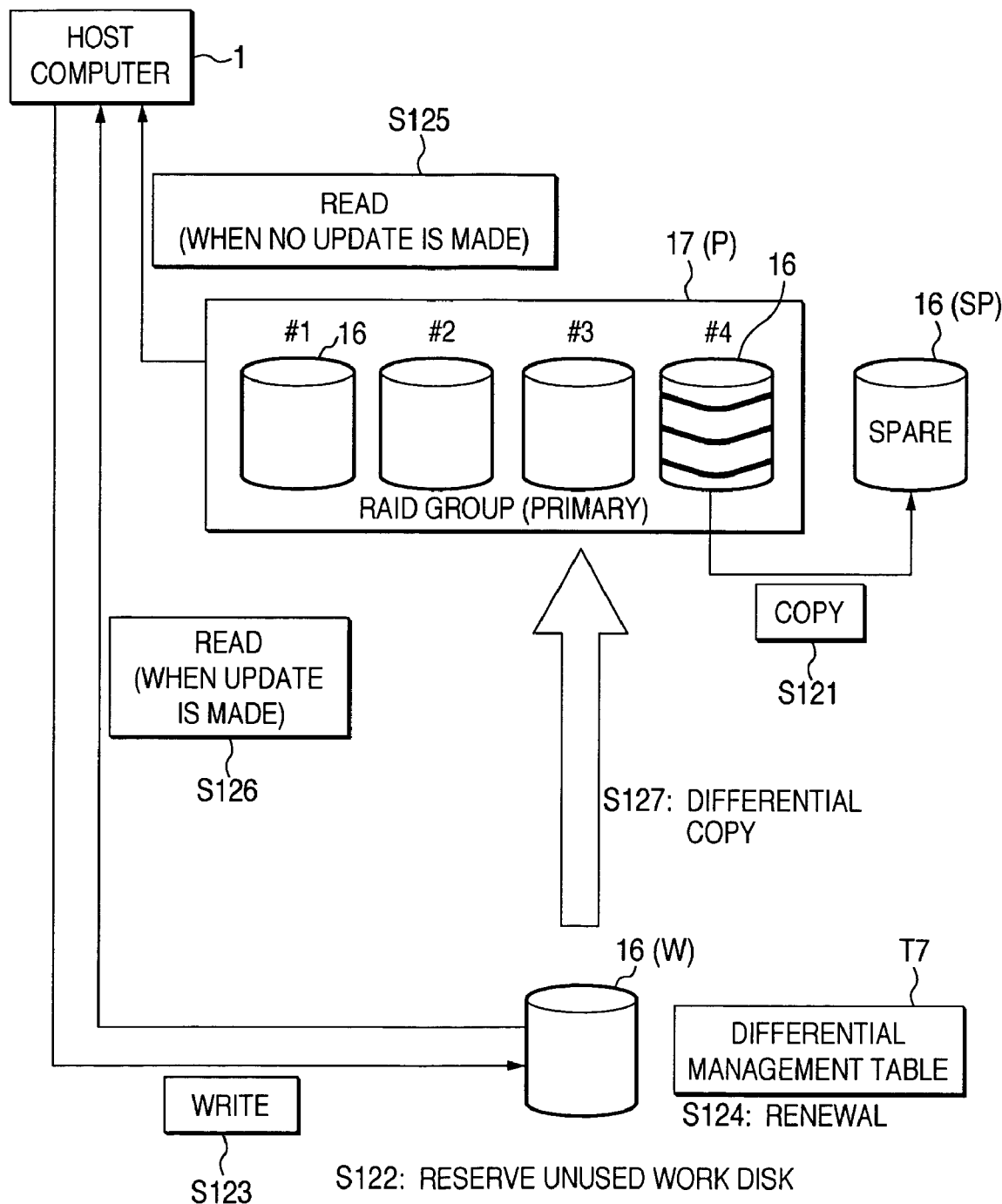
FIG. 14 is a schematic explanatory drawing generally showing a method of avoiding data failure according to a third embodiment.

FIG. 14 is a schematic explanatory drawing of an entire operation of a method of avoiding data failure according to the present embodiment. When occurrence of failure in a certain disk drive 16 (#4) is anticipated, data transfer to the spare disk drive 16(SP) is started (S121).

Upon start of this data transfer, at least one unused work disk drive 16(W) is reserved (S122). When a write request is issued from the host computer 1, the update data is stored in a work disk drive 16(W) (S123). The data stored in the work disk drive 16(W) is controlled by a differential management table T7 (S124).

When a read request is issued from the host computer 1, and if data to be read exists in a main disk drive 16, which is the original location of backupdate, the data is read out form the main disk drive 16 (S125). When data existing in a faulty disk drive 16(#4) is requested, the data is recovered based on the contents stored in other normal disk drives 16 (#1–3), and the recovered data is provided to the host computer 1. The data requested from the host computer 1 exists in the work disk drive 16(W), the data is read out from the work disk drive 16(W), and is provided to the host computer 1 (S126). Then, when data transfer to the spare disk drive 16(SP) is completed, the data backed up in the work disk drive 16 is copied to the main disk drive 16 (faulty disk drive is excluded) and the spare disk drive 16 (SP).

FIG. 15 is an explanatory drawing showing an example of the configuration of various management tables stored in the disk array system 10. FIG. 15A shows a disk management table T5. In the disk management table T5, the disk drive number, the storage volume, and the status are coordinated with all the disk drives 16 included in the disk array system 10. The status includes at least "UPDATE DATA BEING BACKED UP" and "NULL". In the example shown in the drawing, it is shown that the main disk drives 16 (#1–4) are in the data backup mode.

FIG. 15B and FIG. 15C are work disk management tables T6. FIG. 15B shows a state before data transfer to the spare disk drive 16 (SP) and FIG. 15C shows a state after data transfer, respectively. The work disk management table T6 controls the work disk drive number, the storage volume, the status, the corresponding main disk drive number, and the terminal address to which the update data is stored, while coordinating them with respect to each other.

In the state before data transfer, both of two work disks 16 (#60, 61) are in the "UNUSED" status, and are not coordinated with the main disk drive 16. When data transfer is started, in an example shown in the drawings, one work disk drive 16 (#60) is coordinated with four main disk drives 16 (#1–4). The status changes from "UNUSED" to "IN USE". In one work disk drive 16 (#60), update data directed to four main disk drives 16 (#1–4) are stored respectively, and the position of the latest update data is shown as a terminal address.

FIG. 16 is an explanatory drawing showing a differential management table T7 stored in the disk array system 10. The differential management table T7 is an example of "differential management information", in which the main disk drive number, the address in the main disk drive 16, the work disk drive number, and the address in the work disk drive 16 are coordinated with each other. In the example shown in the drawing, it is shown that data to be stored in the addresses "1" and "2" of the main disk 16(#1) are backed up in the addresses "1" and "2" in the work disk drive 16 (#60). In the example shown in the drawing, data to be stored in the addresses "5", "2", and "6" in the main disk drive 16 (#2) are stored in the addresses "3", "4", and "5" in the work disk drive 16 (#60), respectively. In addition, in the example shown in the drawing, data to be stored in the address "3" in the main disk drive 16(#3) is stored in the address "6" in the work disk drive 16 (#60), and the position of the work disk drive address "6" is the terminal address.

Figure 17:
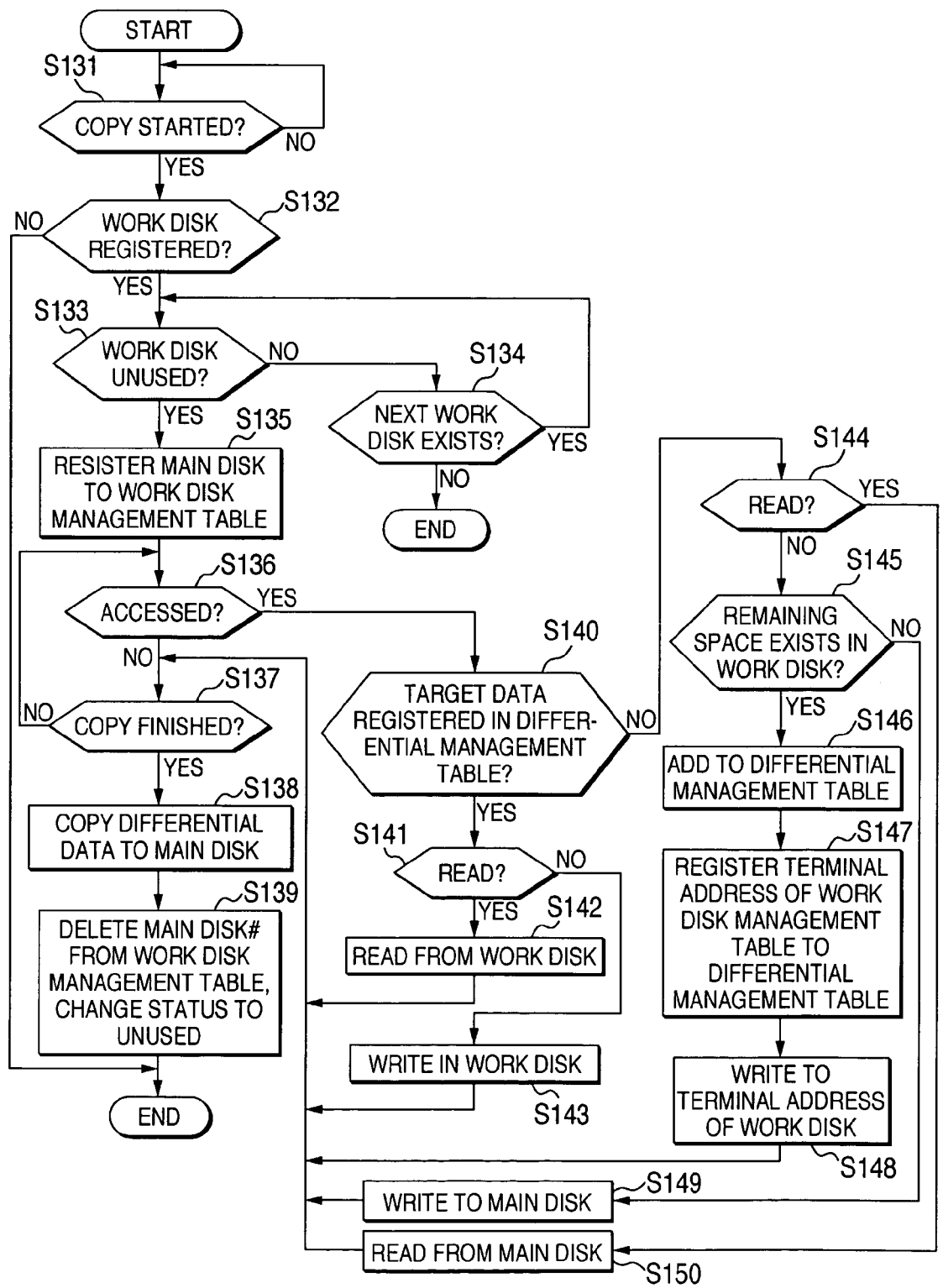
FIG. 17 is a flowchart showing a data backup process.

FIG. 17 is a flowchart showing data backup process executed by the DKA 12. The steps from S131 to S135 are almost the same as S71 to S75 described in conjunction with FIG. 12 except that the data backup area is a disk. In other words, when data transfer is started (YES in S131), the DKA 12 judges whether or not the work disk drive 16 is registered (S132), and then detects the unused work disk drives 16 (YES in S133) by inspecting the registered work disk drives 16 in sequence (S134).

The DKA 12 observes whether or not an access request is issued from the host computer 1 until data transfer to the spare disk drive 16(SP) is completed (S137)(S136). When data transfer is completed (YES in S137), the update data backed up in the work disk drive 16 is copied to the main disk drive 16 and the spare disk drive 16 (SP) (S138). After feedback of the differential data is completed, the main disk drive number and the like are deleted from the work disk management table T6, and the status is returned to "UNUSED" to release the work disk drive 16 (S139). The status of the main disk drive 16 is set to "UPDATE DATA BEING BACKED UP" during data transfer, and the status is changed to "NULL" when data transfer is finished.

When an access request is issued from the host computer 1 during data transfer (YES in S136), the DKA 12 judges whether or not the requested data is registered in the differential management table T7 (S140). When the requested data is registered in the differential management table T7 (YES in S140), the DKA judges whether or not the access request from the host computer 1 is a read request (S141). When it is the read request (YES in S141), the DKA 12 reads out the target data from the work disk drive 16 (S142), stores it to the cache memory 14, and returns to S137. When it is a write request (NO in S141), the DKA 12 stores the update data to the work disk drive 16 (S143), and returns to S137. What should be noted here is that it is different from the journal file, and the duplex data writing to the same addresses is overwritten.

When the data requested from the host computer 1 is not registered in the differential management table T7 (NO in S140), the DKA 12 judges whether or not the access request from the host computer 1 is a read request (S144). If it is not the read request (No in S144), the DKA 12 judges whether or not there is enough space remained to store the update data in the work disk drive 16 (S145). When there is remaining space in the work disk drive 16 (YES in S145), the DKA 12 registers the destination address of the update data and the like to the differential management table T7 (S146). The DKA 12 registers the terminal address to the differential management table T7 (S147), and stores the update data in the terminal address of the work disk drive 16 (S148).

When there is no space remaining in the work disk drive 16 (NO in S145), the DKA 12 stores the update data in the main disk drive 16 (S149), and returns to S137. When it is a read request of data which is not registered in the differential management table T7 (YES in S144), the DKA 12 reads data from the main disk drive 16 (S150), stores it in the cache memory 14, and returns to S137.

Figure 18:
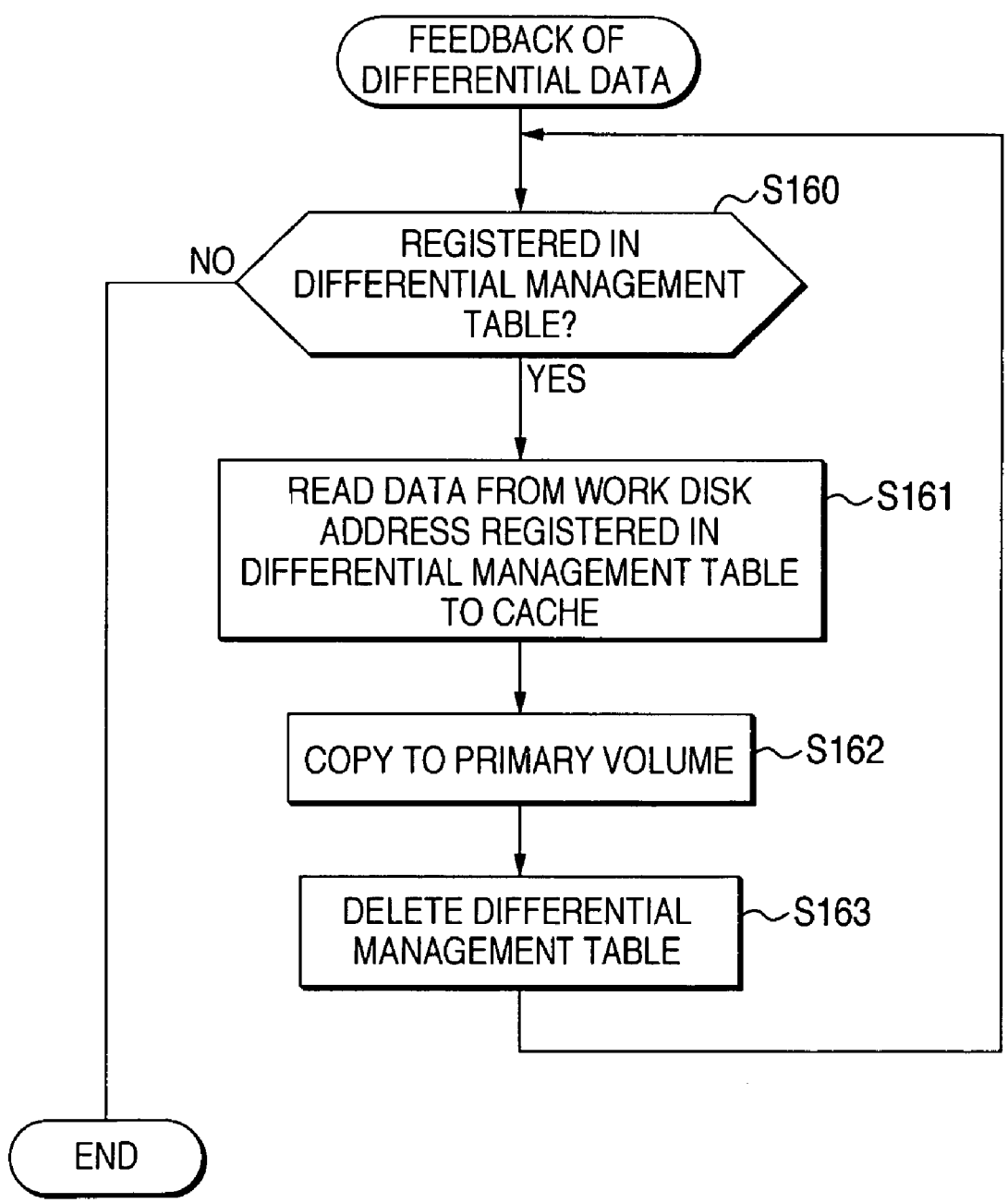
FIG. 18 is a flowchart showing a feedback process of differential data.

FIG. 18 is a flowchart showing a feedback processing of differential data. This processing corresponds to S138 in FIG. 17. The DKA 12 judges whether or not data is registered in the differential management table T7 (S160). When the data is not registered in the differential management table T7 (NO in S160), there is no data to be fed back exists in the main disk drive 16, and thus terminates the processing.

When data is registered in the differential management table T7 (YES in S160), the DKA 12 reads all the data from the work disk drive 16 based on the work disk address registered in the differential management table T7, and the read-out data is stored in the cache memory 14 (S161). The DKA 12 copies all the data read out in the cache memory 14 to the corresponding addresses in the corresponding main disk drives 16, respectively (S162). Then, the DKA 12 deletes the differential management table T7 (S163). Although a case in which all the data backed up in the work disk drive 16 are read out to the cache memory 14 is described in the example shown in the drawing, it is not limited thereto, and it is also possible to read out data corresponding to one address to the cache memory 14 one by one and copies them to the main disk drive 16.

4. Fourth Embodiment

Figure 19:
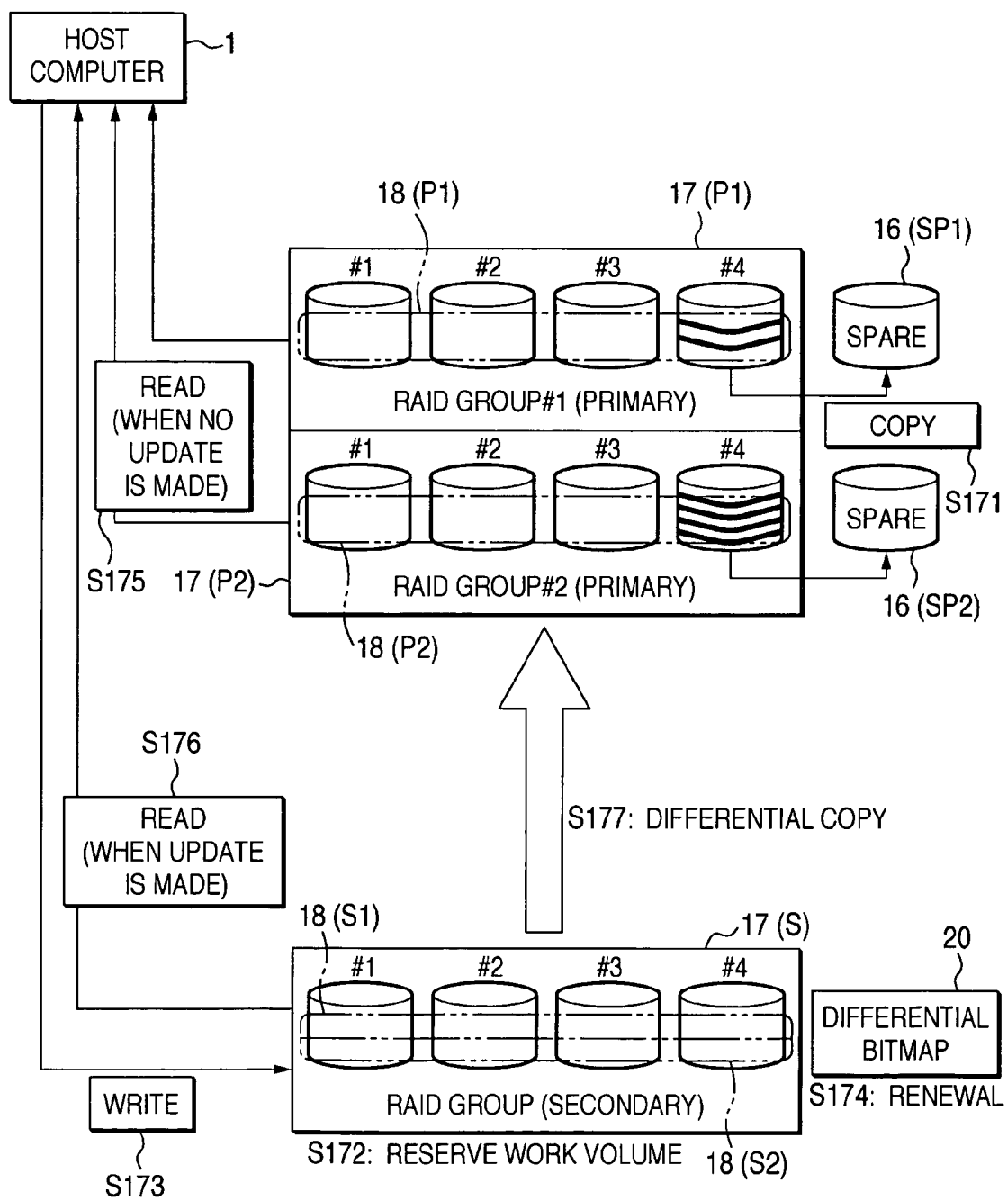
FIG. 19 is a schematic explanatory drawing generally showing a method of avoiding data failure according to a fourth embodiment.

Referring to FIG. 19 and FIG. 20, a fourth embodiment will be described. A characteristic of the present embodiment is that it can also be applied even when the sparing process are executed in a plurality of RAID groups, respectively. The present embodiment can be applied to both of the second embodiment and the third embodiment. However, in FIG. 19, it is described as a modification of the second embodiment.

In the present embodiment, in the plurality of RAID groups including the RAID group 17 (P1) and the RAID group 17 (P2), occurrence of failure is anticipated individually in each disk drive 16. When a faulty disk drive 16 is detected, data in the faulty disk drives 16 is copied to the respective spare disk drives 16 (SP1), (SP2) separately.

When sparing process is started in any one of the RAID groups 17, a work volume 18(S) having a space is reserved out of the registered work volumes, and is coordinated with the logical volume 18 of the original data (S172). When the sparing process is stared in another RAID group, another work volume 18(S) is reserved. In an example shown in the drawing, the logical volume 18(P1) of the first RAID group 17 (P1) corresponds to the work volume 18 (S1), and the logical volume 18 (P2) in the second RAID group 17 (P2) corresponds to the work volume 18 (S1).

When a write request is issued from the host computer during data transfer, data is written in the corresponding to the work volume 18(S). The differential bitmap 20 controls data registered in the work volume 18(S) (S174).

When a read request is issued from the host computer during data transfer, if the requested data exists in the main logical volume 18, data is recovered from the main logical volume 18 and is provided to the host computer 1 (S175). When the data requested by the host computer 1 exists in the work volume 18(S), data is read out from the work volume 18(S) (S176).

When data transfer is completed, data which is backed up in the work volume 18(S) is copied to the main logical volume 18 and the spare disk drive 16(SP) respectively (S177). The processing described above is executed independently for each RAID group.

FIG. 20 shows a management table stored in the disk array system 10. FIG. 20A shows the work volume management table T4 as in the second embodiment. The difference from the work volume management table in the second embodiment shown in FIG. 11B is that a plurality of primary volumes can be coordinated with each work volume 18(S).

For example, in the work volume management table T4 in the present embodiment, two primary volumes 18 (#1, 4) are coordinated with the work volume 18 (#10). For example, one of the primary volume 18 (#1) belongs to the RAID group 17 (P1), and the other primary volume 18 (#4) belongs to another RAID group 17(P2). In this manner, the work volume 18(S) can be coordinate with the logical volumes 18 in the different RAID groups 17 respectively.

FIG. 20B shows the work disk management table T6 in a case of being applied to the third embodiment. The difference from the work disk management table shown in FIG. 15C is that a plurality of main disk drives 16 (#1–8) configuring a plurality of RAID groups respectively can be coordinated with a single work disk drive 16 (#60).

In this manner, data failure avoiding process can be activated in a multiplexed manner only by extending the respective management tables T4 and T6.

5. Fifth Embodiment

Referring now to FIG. 21 to FIG. 24, a fifth embodiment will be described. A characteristic of the present embodiment is that only a write request to the disk drive 16 in which occurrence of failure is anticipated is backed up. The present embodiment can be applied to the first embodiment to the third embodiment, an example in which the present embodiment is applied to the second embodiment will be described in FIG. 21.

Figure 21:
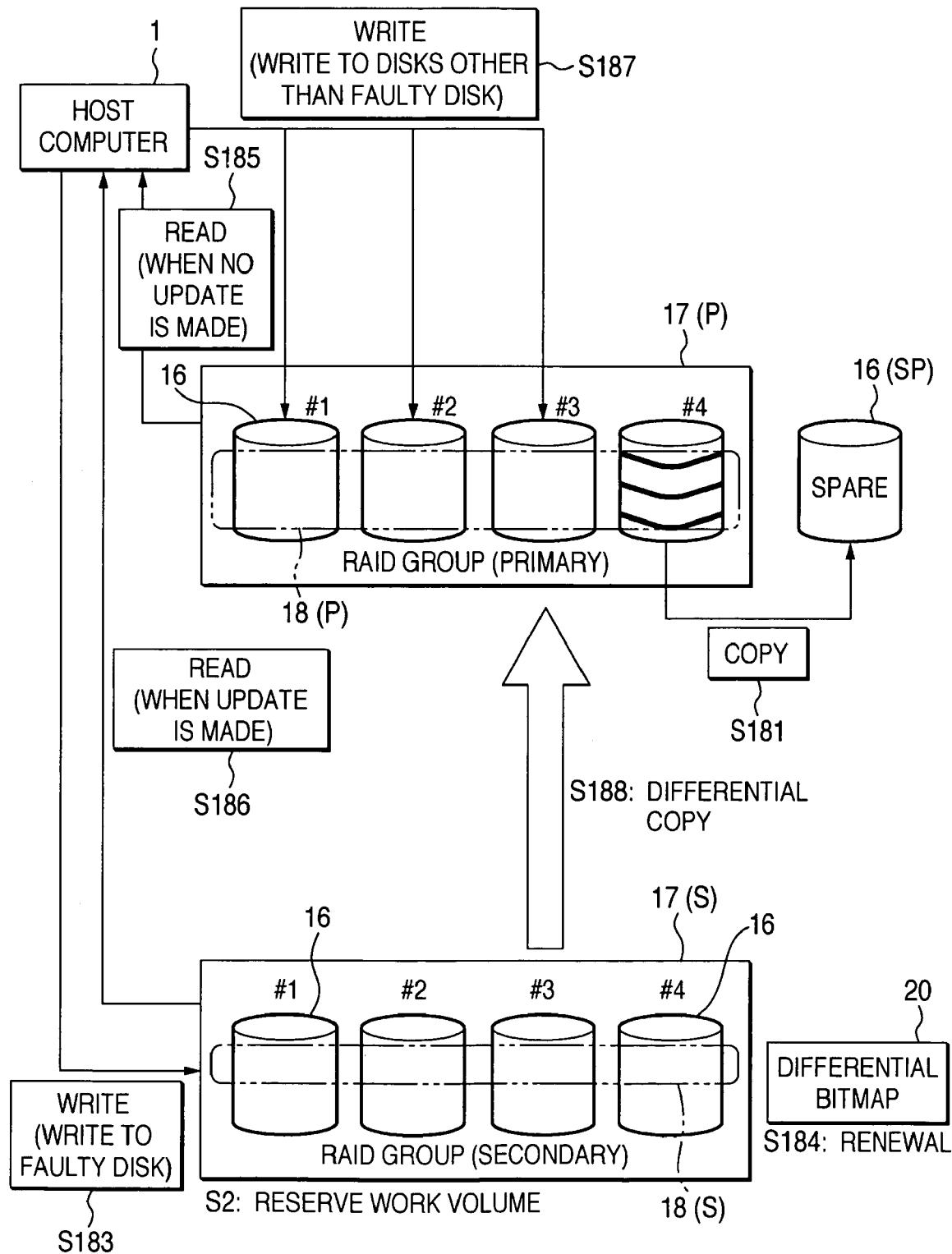
FIG. 21 is a schematic explanatory drawing generally showing a method of avoiding data failure according to a fifth embodiment.

FIG. 21 is a schematic explanatory drawing generally showing a method of avoiding data failure. When the faulty disk drive 16 is detected and data transfer to the spare disk drive 16(SP) is started (S181), the work volume 18(S) having a space is reserved (S182). This work volume 18(S) is used for backing update (including parity) to be written into the faulty disk drive 16 (#4). Data directed to other normal disk drives 16 (#1–3) is not written in the work volume 18(S).

When a write request directed to the faulty disk drive 16 (#4) is issued from the host computer 1 during data transfer, the update data is stored in the work volume 18(S) (S183). The differential bitmap 20 controls data stored in the work volume 18(S) (S184).

When a read request is issued from the host computer 1 during data transfer, only the target data is read out from the main disk drive 16 if the requested data exists in the normal disk drives 16(#1–3) (S185). The data requested to be read out exists in the faulty disk drive 16(#4), data is read out from the work volume 18(S) (S186).

On the other hand, when a write request directed to the normal disk drives 16 (#1–3) is issued from the host computer 1 during data transfer, data is written into the respective disk drives 16 (#1–3) (S187).

When data transfer is completed, data backed up in the work volume 18(S) is copied to the spare disk drive 16(SP) (S188).

Figure 22:
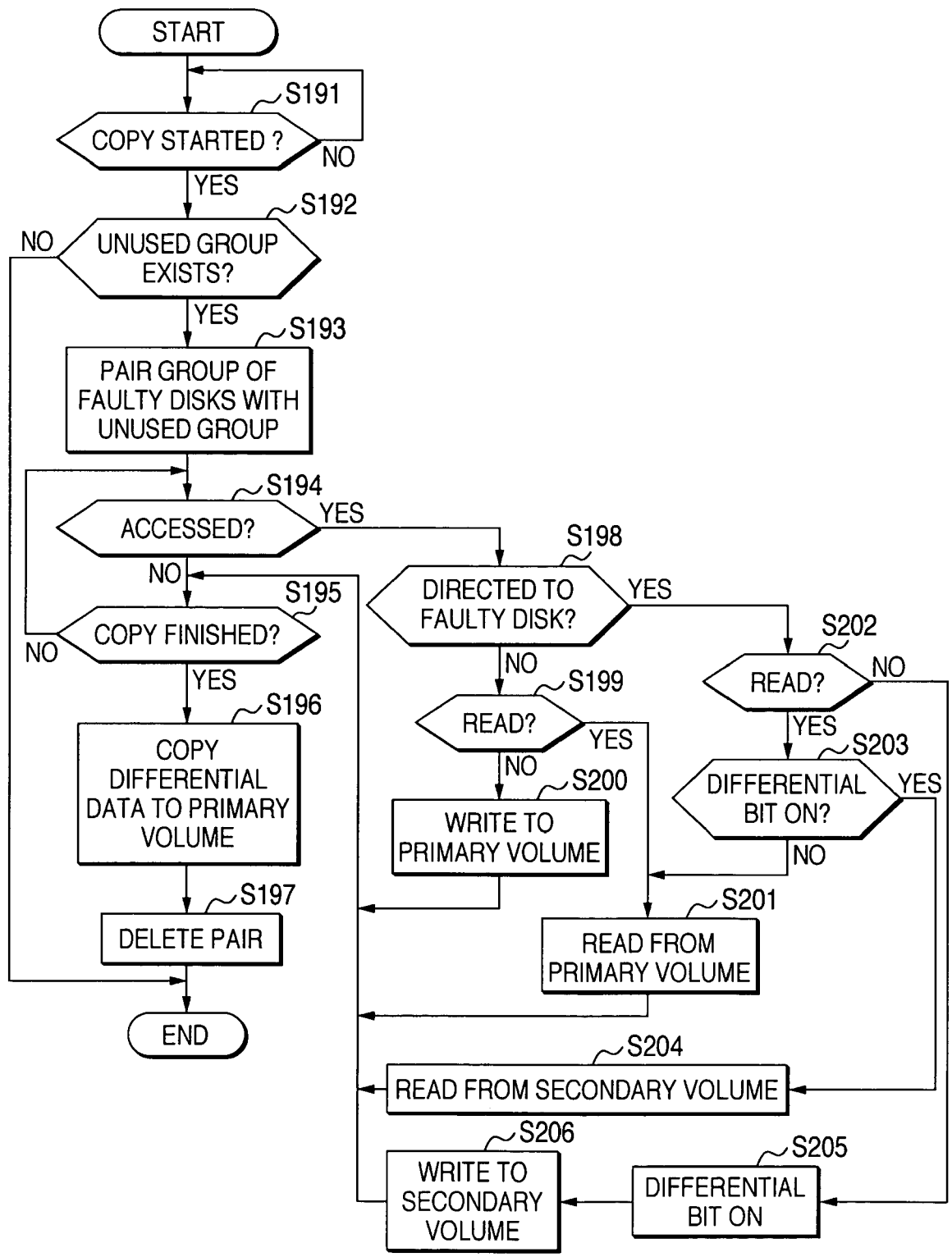
FIG. 22 is a flowchart showing a method of the data backup process.

FIG. 22 is a flowchart showing a data backup process in a case in which the present embodiment is applied to the first embodiment. In this embodiment, the RAID group is used as a data backup area for the faulty disk drive 16.

The steps from S191 to S197 in this process will not be described since it is the same process as describe in S31 to S37 in conjunction with FIG. 8. When an access request is issued from the host computer 1 (YES in S194), the DKA 12 judges whether or not the data (including parity) which is requested to be accessed exists in the faulty disk drive 16 (S198). In a case in which data which exists in the disk drive 16 other than the faulty disk drive 16 is requested (NO in S198), the DKA 12 judges whether or not the access request from the host computer 1 is a read request (S199). In the case of a write request (NO in S199), the DKA 12 writes data in the primary volume (main disk drive, the same in this process, hereinafter) (S200), and the procedure goes to S195. When the access request from the host computer 1 is a read request (YES in S199), the DKA 12 reads out data from the primary volume (S201).

In the case of an access request directed to the faulty disk drive 16 (YES in S198), the DKA 12 judges whether or not the access request is a read request (S200). In the case of a read request (YES in S202), the DKA 12 judges whether or not the differential bit corresponding to the requested data is set to "1" (S203). When the differential bit is set to "0" (NO in S203), the data is not updated, and thus the DKA 12 recovers the requested data based on the data in the primary volume (S201), and returns to S195. When the differential bit is set to "1" (YES in S203), since it is the update data, the DKA 12 reads data from the work volume (secondary volume the same in this process, hereinafter) 18 (204), and the procedure goes to S195.

When it is an access request directed to the faulty disk drive 16, and is a write request (NO in S202), the DKA 12 sets the corresponding differential bit to "1" (S205), writes data in the work volume 18 (S206), and then returns to S195.

Figure 23:
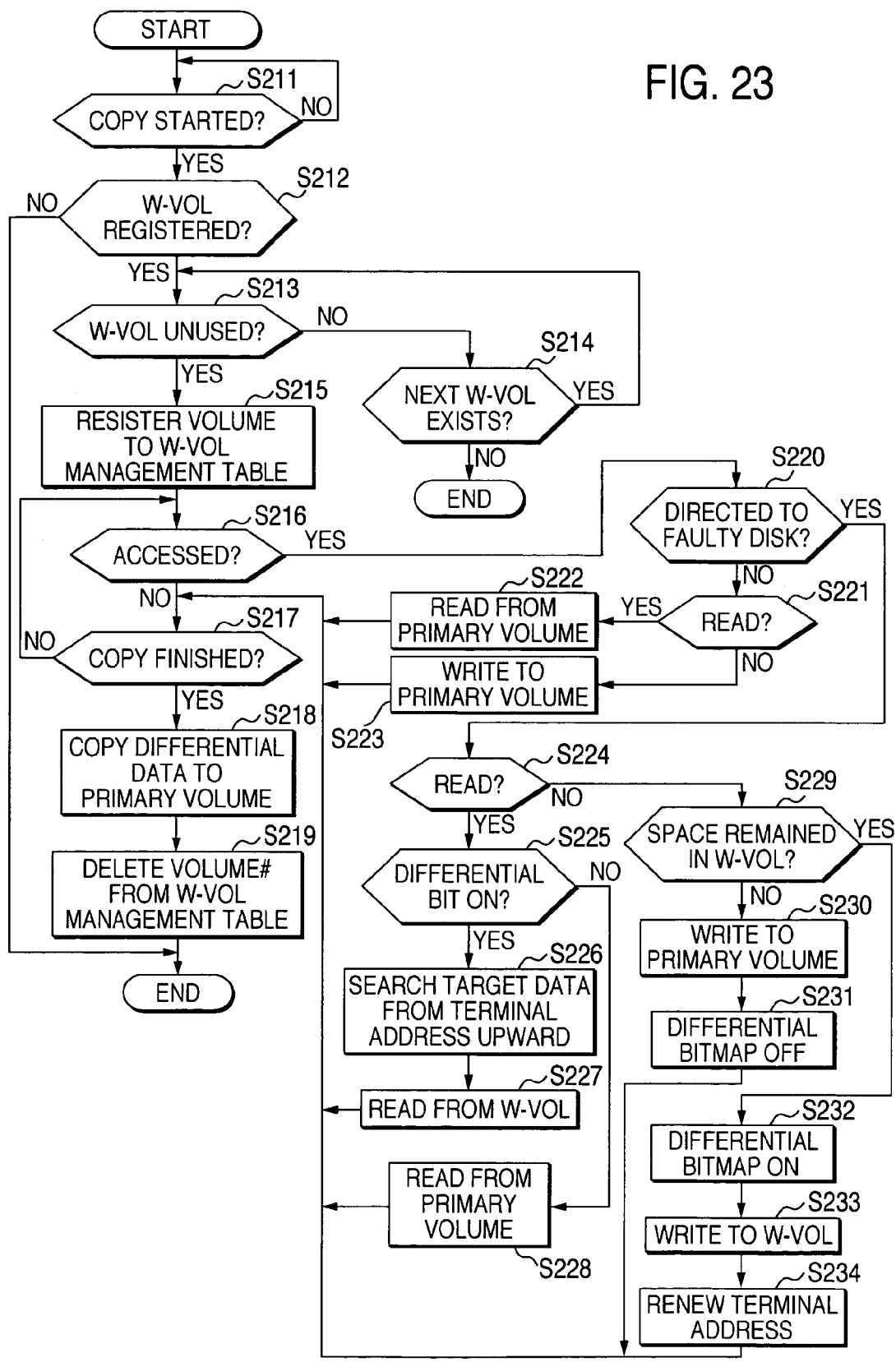
FIG. 23 is a flowchart showing another example of the data backup process.

FIG. 23 is a flowchart showing a data backup process in a case in which the present embodiment is applied to the second embodiment. Since the steps S211 to S219 are the same procedure as the steps S71 to S79 described in conjunction with FIG. 12, the description will not be made.

When an access request is issued from the host computer 1 (YES in S216) during data transfer to the spare disk drive 16(SP), the DKA 12 judges whether or not the requested data exists in the faulty disk drive 16 (S220). When the data existing in other normal disk drives 16 is requested (YES in S220), the DKA 12 judges whether or not the access request from the host computer 1 is a read request (S221). When it is a read request (YES in S221), the DKA 12 reads data from the primary volume (S222) and returns to S217. When it is a write request (NO in S221), the DKA 12 writes the update data in the primary volume (S223).

When the access request from the host computer 1 is directed to the faulty disk drive 16 (YES in S220), the DKA 12 judges whether or not the access request is a read request (S224). When it is a read request (YES in S224), the DKA 12 inspects whether or not the differential bit corresponding to the requested data is set to "1" (S225). When the differential bit is set to "1" (YES in S225), the DKA 12 searches the target data from the terminal address upward (ascending order in time sequence)(S226). Then the DKA 12 reads the found data from the work volume 18 (S227), and returns to S217. When the differential bit corresponding to the request data is set to "0" (No in S225), the DKA 12 reads data from the primary volume (S228), and returns to S217.

When the access request from the host computer 1 is a write request directed to the faulty disk drive 16 (NO in S224), the DKA 12 inspects whether or not there is a remaining space left in the work volume 18 (S229). When there is no remaining space in the work volume 18 (No in S229), the DKA 12 writes the update data to the primary volume (S230). Then, the DKA 12 sets the differential bit corresponding to the update data to "0" (S231), and returns to S217. When there is a remaining space in the work volume 18(YES in S229), the DKA 12 sets the difference bit corresponding to the update data to "1" (S232), and writes the update data to the work volume 18 (S233). The DKA 12 updates the terminal address (S234), and returns to S217.

Figure 24:
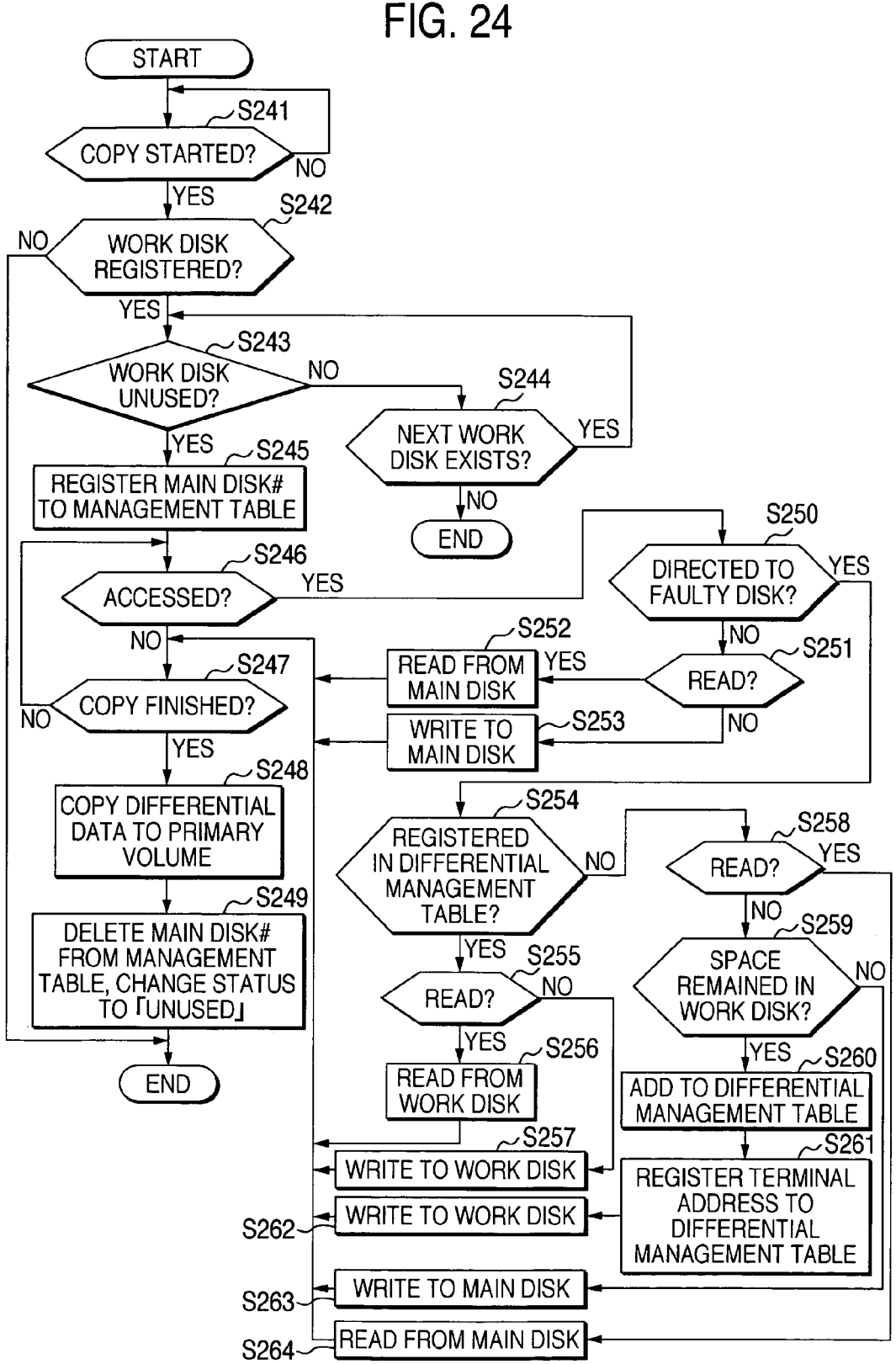
FIG. 24 is a flowchart showing still another embodiment of the data backup process.

FIG. 24 is a flow chart showing a data backup process in a case in which the present embodiment is applied to the third embodiment. Since the steps from S241 to S249 in this process are the same as the steps from S131 to S139, the description will not be made.

When an access request directed to the normal disk drives 16 other than the faulty disk drive 16 (SP) is issued from the host computer 1 (NO in S250) during data transfer to the spare disk drive 16 (SP), the DKA 12 judges whether or not the access request is a read request (S251). In a case in which it is a read request (YES in S251), the DKA 12 reads data from the main disk drive 16 (S252), and returns to S247. When it is a write request (NO in S251), the DKA 12 writes the update data to the main disk drive 16 (S253), and returns to S247.

On the other hand, when an access request directed to the faulty disk drive 16 is issued from the host computer 1 (YES in S250), the DKA 12 judges whether or not data which is registered in the differential management table T7 is requested (S254). When it is the data registered in the differential management table T7 (YES in S254), the DKA 12 judges whether or not the access request from the host computer 1 is a read request (S255). When it is a read request (YES in S255), the DKA 12 reads the data from the work disk (S265) and returns to S247.

When it is an access request directed to data which is not registered in the differential management table T7 (NO in S254), the DKA 12 judges whether or not the access request is a read request (S258). When it is a read request (NO in S258), the DKA 12 inspects whether or not there is a remaining space in the work disk (S259). When there is a remaining space in the work disk (YES in S259), the DKA 12 registers the original address of the update data to the differential management table T7 (S260). The DKA also resisters the terminal address in the differential management table T7 (S261), writes a update data in the work disk (S262), and returns to S247.

6. Sixth Embodiment

Referring to FIG. 25 to FIG. 29, a sixth embodiment will be described. A characteristic of the present embodiment is that in sparing process and data backup process, data stored in the faulty disk drive is recovered based on data stored in the normal disk drive and the recovered data is copied in the spare disk drive and provides it to the host computer.

Figure 25:
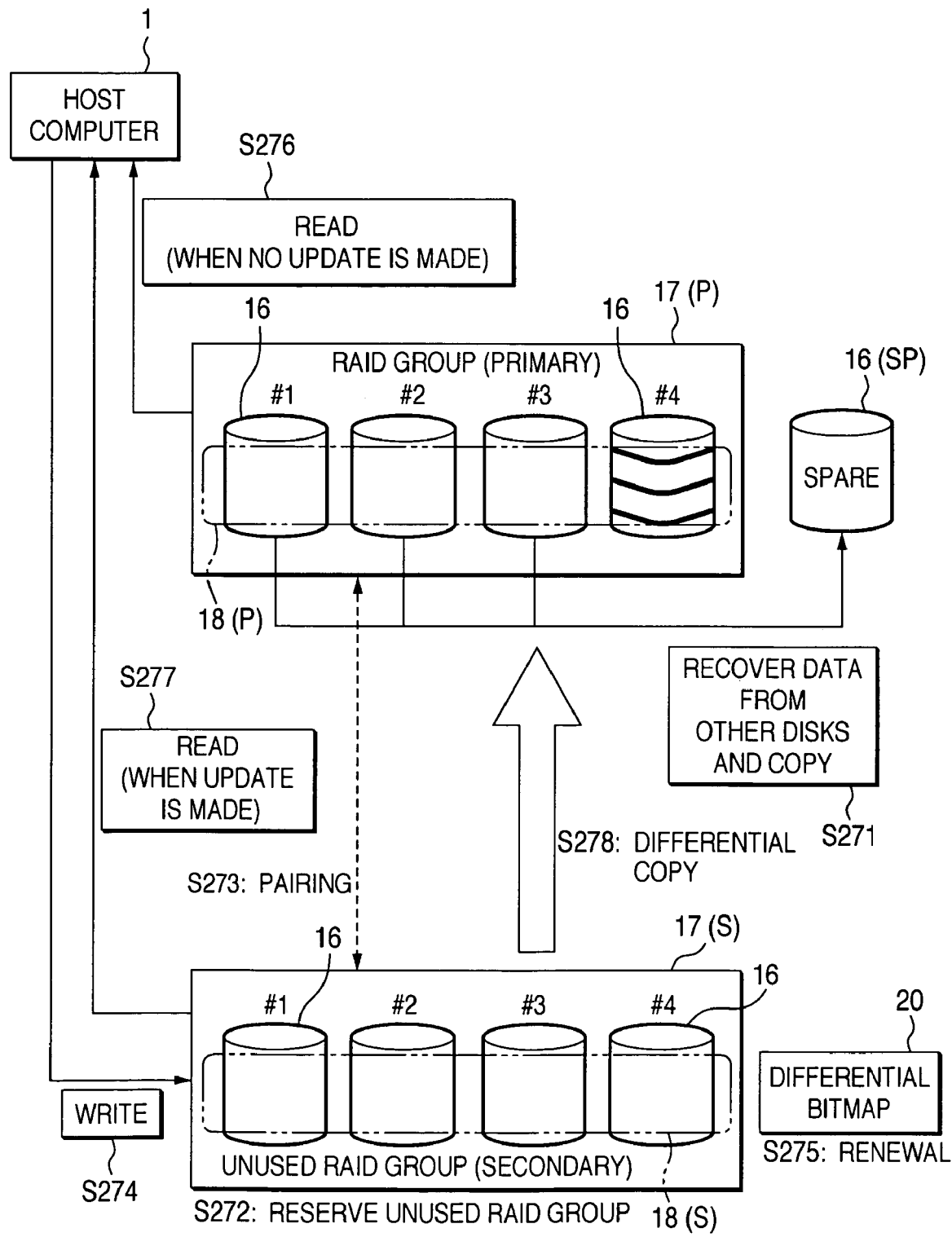
FIG. 25 is a schematic explanatory drawing generally showing a method of avoiding data failure according to a sixth embodiment.

Although the present embodiment can be applied to any of the first to third embodiments, a case in which the present embodiment is applied to the first embodiment will be described in FIG. 25. FIG. 25 is a schematic explanatory drawing showing the entire operation of a method of avoiding data failure according to the present embodiment.

In the same manner as the respective embodiments described above, when occurrence of failure in the disk drive 16 (#4) configuring the RAID group 17(P) is anticipated, data transfer to the spare disk drive 16 (SP) is started (S271). What should be noted here is that data is not read out directly from the faulty disk drive 16 (#4) and copied to the spare disk (SP), but data in the faulty disk drive 16 (#4) is recovered based on the contents stored in other normal disk drives 16 (#1–3) and copied to the spared disk drive 16 (SP). Therefore, reading from the faulty disk drive 16(#4) is not performed during sparing process.

When data transfer to the spare disk drive 16 (SP) is started, the unused RAID group 17(S) is reserved (S272), and pairs with the main RAID group 17 (P) (S273). In the sub RAID group 17(S), a secondary volume 18(S) corresponding to the main logical volume 18(P) of the main RAID group 17(P) is established in the sub RAID group 17(S).

When a write request directed to the main RAID group 17(P) is issued from the host computer 1 during data transfer, the update data is stored in the secondary volume 18(S) (S274). Data stored in the secondary volume 18(S) is controlled by the differential bitmap 20 (S275).

When a read request of data which is not updated is issued from the host computer 1 during data transfer, data is read out from the primary volume 18(P) and provided to the host computer 1 (S276). When it is a read request directed to the data stored in the faulty disk drive 16 (#4'), data is recovered based on data from other normal disk drives (#1–3).

When a read request of update data is issued from the host computer 1 during data transfer, data is read out from the secondary volume 18(S) and provided to the host computer (S277). Then, when data transfer is finished, the contents stored in the secondary volume 18(S) is copied to the primary volume 18(P) (except for the faulty disk drive) and the spare disk drive 16 (SP) based on the differential bitmap 20 (S278).

Figure 26:
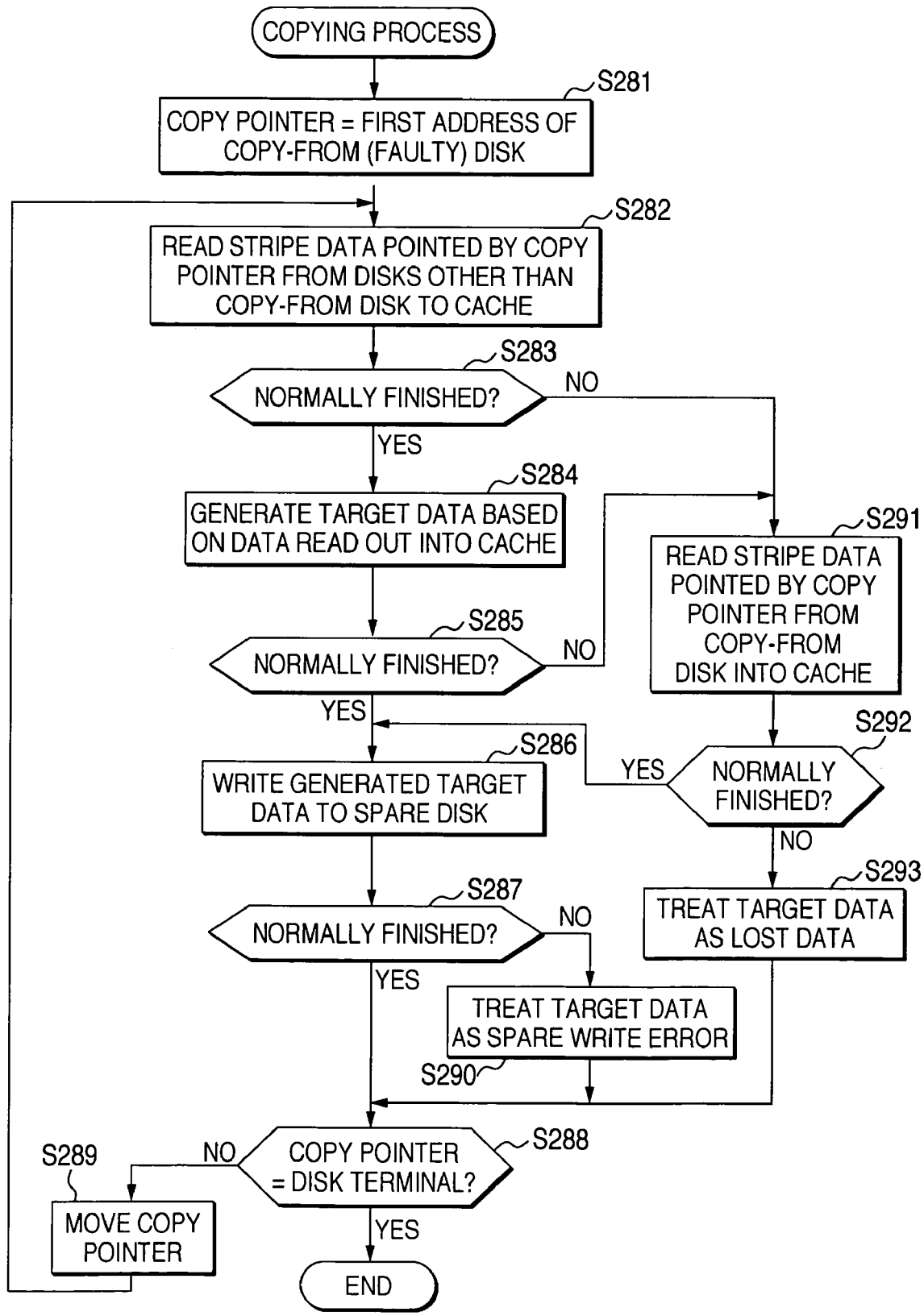
FIG. 26 is a flowchart showing a sparing process.

FIG. 26 is a flow chart showing a sparing process (data transfer process) according to the present embodiment. The DKA 12 sets the copy pointer to the first address of the copy-from disk drive (faulty disk drive) (S281). The DKA 12 then copies stripe data pointed by the copy pointer from other normal disk drives 16 other than the copy-from disk drive into the cache memory 14 (S282).

When reading of stripe data to be used for data recovery to the cache memory 14 is normally finished (YES in S283), the DKA 12 executes inverse operation based on the read-out data in the cache memory 14, and recovers data which should be existing in the copy-from disk drive (S284). When data recovery is normally finished (YES in S285), the DKA 12 writes the recovered data to the spare disk drive 16 (SP) (S286). When data writing to the spare disk drive 16 (SP) is normally finished (YES in S287), the DKA 12 judges whether or not the copy pointer reached the terminal address of the copy-from disk drive to be copied, that is, whether or not data transfer is completed (S288). When data transfer is not completed (NO in S288), the DKA 12 moves the copy pointer to the next address (S289), and the procedure returns to S282. The steps S282 to S289 are repeated until data transfer is completed.

When reading of stripe data from the normal disk drives 16 is failed (NO in S283), the DKA 12 reads target data directly from the copy-from disk drive 16 and stores it in the cache memory 14 (S291). When data reading from the copy-from disk drive 16 is successful (YES in S292), the procedure proceeds to S286. When data reading from the copy-from disk drive 16 is failed (NO in S292), it is treated that the target data to be copied is lost (S293) and the procedure goes to S288.

On the other hand, when the recovered data cannot be written in the spare disk drive 16 (SP) normally (NO in S287), it is treated as write error of target data (S290), and the procedure proceeds to S288.

Figure 27:
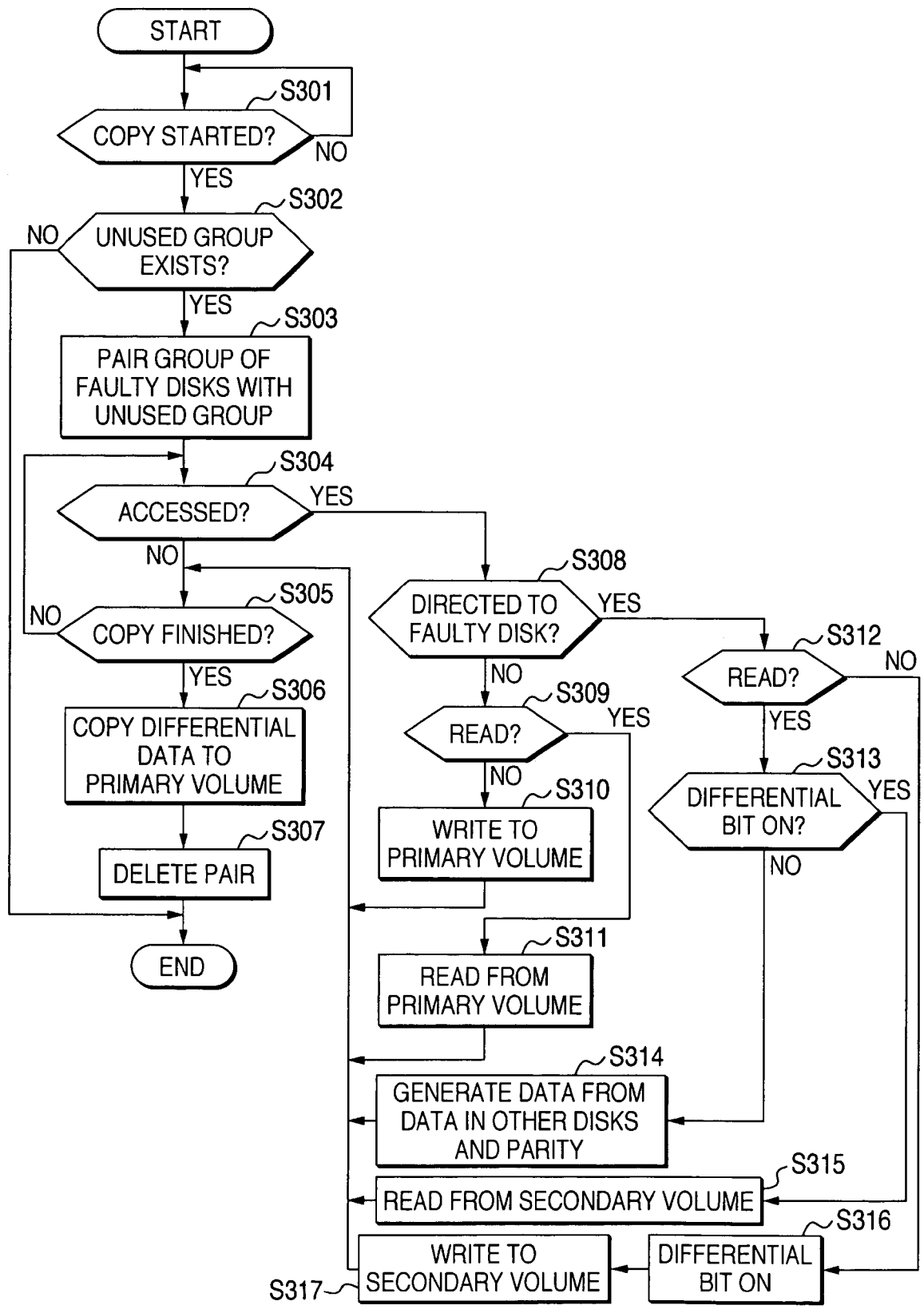
FIG. 27 is a flowchart showing the data backup process.

FIG. 27 shows a data backup process when the present embodiment is applied to the first embodiment. Many steps in this process execute the same process as the steps described in FIG. 22. Therefore, S314 will mainly be described. When a read request directed to the faulty disk drive 16 is issued (YES in S312), and the requested data is not updated (NO in S313), the DKA 12 recovers the target data based on data read from other normal disk drives 16 (S314) and returns to S305.

Figure 28:
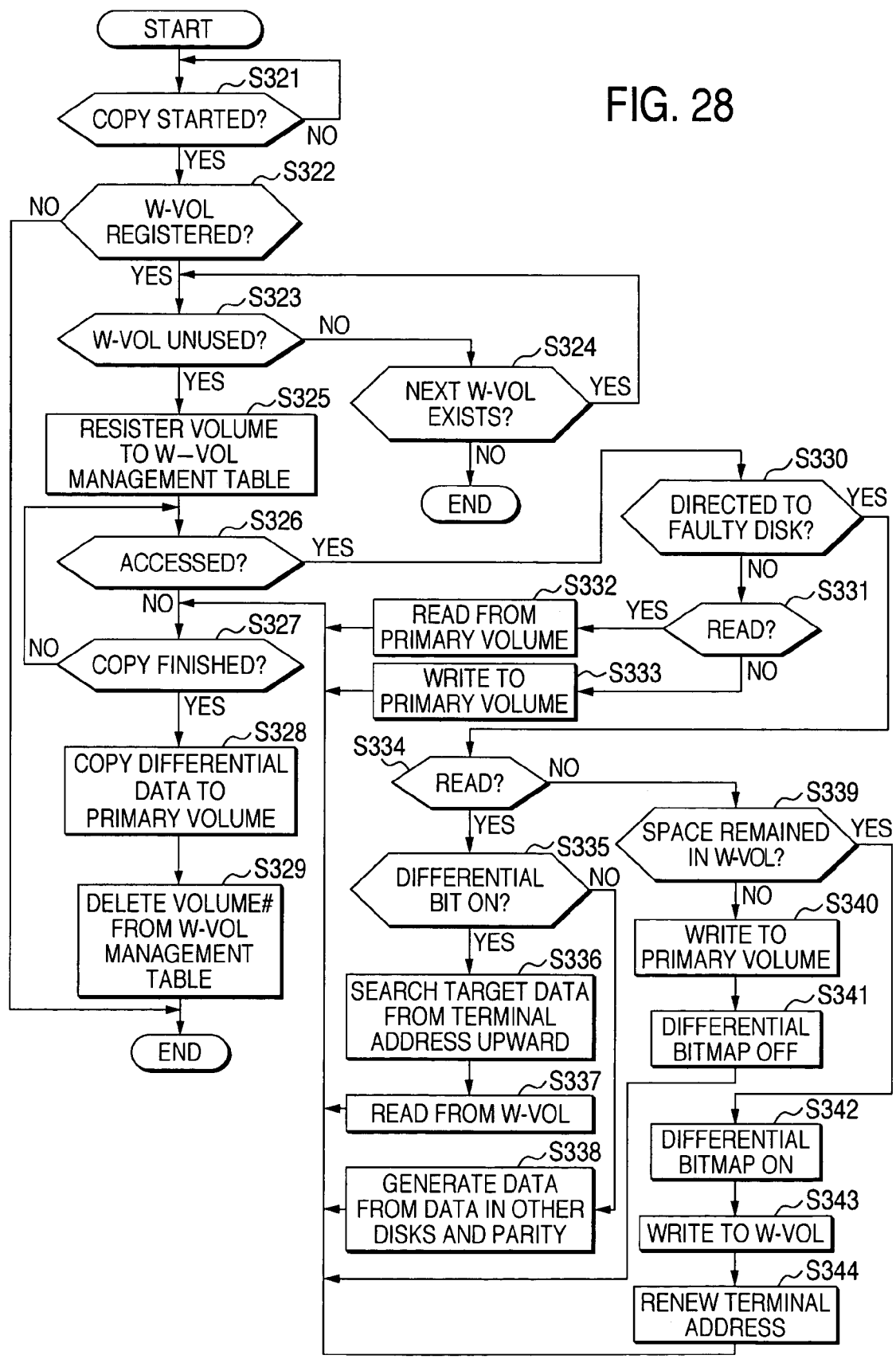
FIG. 28 is a flow chart showing another example of the data backup process.

FIG. 28 shows a data backup process when the present embodiment is applied to the second embodiment. Many steps in this process execute the same process as the steps described in FIG. 23. Therefore, S338 will mainly be described. When a read request directed to the faulty disk drive 16 is issued (YES in S334), and the requested data is not updated (NO in S335), the DKA 12 recovers the target data (S338) based on data read out from other normal disk drives 16 and returns to S327.

Figure 29:
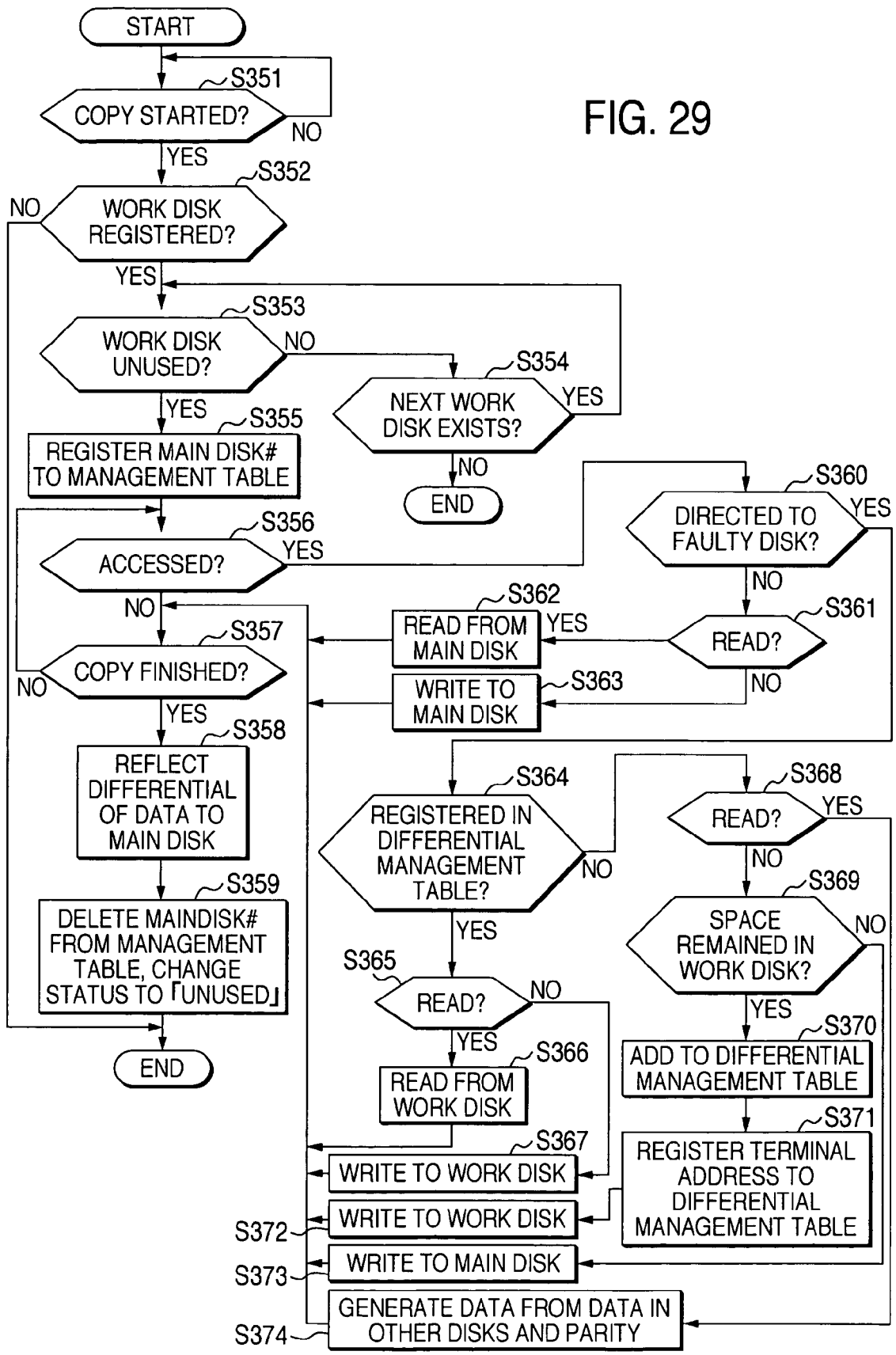
FIG. 29 is a flowchart showing still another example of the data backup process.

FIG. 29 shows a data backup process when the present embodiment is applied to the third embodiment. As described above, many steps in this process are the same process as the steps in FIG. 24. The different step from FIG. 24 is S374. In S374, the DKA 12 reads data from the normal disk drives 16 other than the faulty disk drive 16 and recovers the target data (S374).

The present invention is not limited to the embodiments described above. Various additions or modifications may be made by those skilled in the art within the scope of the present invention. For example, combinations of the embodiments other than those shown in the embodiments are also possible.

What is claimed is:

1. A disk array system comprising:
    a channel adapter for controlling data transfer with respect to a host device;
    a plurality of data disk drives configuring a RAID group,
    at least one spare disk drive provided as a spare for the data disk drives;
    a disk adapter for controlling data transfer with respect to the data disk drives and the spare disk drive;
    a cache memory used by the channel adapter and the disk adapter for storing data;
    a control memory used by the channel adapter and the disk adapter for storing control information;
    a backup storage provided separately from the data disk drives and the spare disk drive;
    a first control unit provided in the disk adapter for observing occurrence of access error with respect to the data disk drives, the first control unit, when the frequency of occurrence of the access error exceeds a predetermined threshold, copying data stored in the data disk drive exceeding the threshold to the spare disk drive via the cache memory;
    a second control unit provided in the disk adapter for processing access request directed to the RAID group during the copying process, the second control unit making the backup storage take over a write request directed to the RAID group; and
    a third control unit provided in the disk adapter for copying data written in the backup storage by the second control unit to the data disk drives and the spare disk drive other than the data disk drive exceeding the threshold when the copying process by the fist control unit is finished.

2. A disk array system according to claim 1, wherein the second control unit processes a read request directed to the data disk drive exceeding the threshold based on the data stored in the data disk drives other than the data disk drive exceeding the threshold.

3. A disk array system according to claim 1, wherein the second control unit processes a read request directed to the data disk drives other than the data disk drive exceeding the threshold based on data copied in the backup storage.

4. A disk array system according to claim 1, wherein the second control unit is associated with differential management information for controlling data written in the backup storage, and determines based on the differential management information whether the read request directed to the RAID group is processed based on data stored in the data disk drives other than the data disk drive exceeding the threshold or based on data stored in the backup storage.

5. A disk array system according to claim 1, wherein the second control unit makes only the write request directed to the data disk drive exceeding the threshold out of write requests directed to the RAID group executed by the backup storage, and makes the write request directed to the each disk drive other than the data disk drive exceeding the threshold executed by the corresponding data disk drive.

6. A disk array system according to claim 1, wherein the second control unit makes a write request directed to the RAID group executed by the backup storage when a space more than a predetermined value is left in the backup storage and makes the write request directed to the RAID group executed by the RAID group when a space more than the predetermined value is not left in the backup storage.

7. A disk array system according to claim 1, wherein the first control unit recovers data in the data disk drive exceeding the threshold based on data stored in the data disk drives other than the data disk drive exceeding the threshold, and copies the recovered data to the spare disk drive.

8. A disk array system according to claim 1, wherein a manual instruction unit for making the first control unit execute copying process is provided.

9. A disk array system according to claim 1, wherein the first control unit and the second control unit can perform multiple operations, and the backup storage accepts write requests directed to each of the plurality of RAID groups.

10. A disk array system according to claim 1, wherein the backup storage can be implemented as at least one of another RAID groups having the same configuration as the RAID group described above, a logical volume, or a disk drive.

11. A method of avoiding failure of a disk array system comprising a channel adapter for controlling data transfer with respect to a host device, a plurality of data disk drives configuring a RAID group, at least one spare disk drive provided as a spare for the data disk drives, a disk adapter for controlling data transfer with respect to the data disk drives and the spare disk drives, a cache memory used by the channel adapter and the disk adapter for storing data, a control memory used by the channel adapter and the disk adapter for storing control information, a backup storage provided separately from the data disk drives and the spare disk drive comprising:
    a first step of observing occurrence of an access error with respect to the data disk drives and judging whether or not the frequency of occurrence of the access error exceeds a predetermine threshold:
    a second step of copying data stored in the data disk drive exceeding the threshold to the spare disk drive when the data disk drive exceeding the threshold is detected in the first step;
    a third step of associating the RAID group with the backup storage by starting the copying process in the first step;
    a fourth step of judging whether or not an access request directed to the RAID group has issued during the copying process in the first step; and
    a fifth step of writing data in the backup storage associated in the third step when issue of the access request is detected in the fourth step, and if the access request is a write request.

12. A method of avoiding failure of a disk array system according to claim 11, further comprising a sixth step of copying data written in the backup storage in the fifth step to the each disk drive other than the data disk drive exceeding the threshold and the spare disk drive when the copying process in the second step is finished.

13. A method of avoiding failure of a disk array system according to claim 11, wherein the fifth step comprises a step of, processing a read request based on data stored in the data disk drives other than the data disk drive exceeding the threshold when the access request detected in the fourth step is the read request directed to the data disk drive exceeding the threshold.

14. A method of avoiding failure of a disk array system according to claim 11, wherein the fifth step determines whether the read request directed to the RAID group detected in the fourth step is processed based on data stored in the data disk drives other than the data disk drive exceeding the threshold or based on data stored in the backup storage by utilizing the differential management information for controlling data stored in the backup storage.

15. A method of avoiding failure of a disk array system according to claim 11, wherein the fifth step makes only the write request directed to the data disk drive exceeding the threshold out of write requests directed to the RAID group detected in the fourth step executed by the backup storage, and makes a write request directed to the each disk drive other than the data disk drive exceeding the threshold executed by the corresponding data disk drive.

16. A method of avoiding failure of a disk array system according to claim 11, wherein the second step recovers data stored in the data disk drive exceeding the threshold based on data stored in the data disk drives other than the data disk drive exceeding the threshold, and copies the recovered data to the spare disk drive.

17. A method of using a disk drive in a disk array system comprising a plurality of disk drives configuring the RAID group, comprising:
   a faulty drive detecting step for observing occurrence of an access error with respect to the each disk drive configuring the RAID group, and when the frequency of
   the access error exceeds a predetermined threshold, determining that it is a faulty disk drive;
   a data copying step for copying data stored in the faulty disk drive to a normal disk drive other than the each disk drive configuring the RAID group when the faulty disk drive is detected in the fault disk drive detecting step,
   an access request detecting step for detecting whether or not an access request directed to the RAID group has issued during the copying process in the data copying step; and
   an access processing step for writing data relating to the write request to a normal disk drive different from the normal disk drive in which the data is copied when a write request is detected in the access request detecting step.

18. A method of using a disk drive in a disk array system according to claim 17, further comprising a data update step for copying data written in the normal disk drive in the access processing step to the each disk drive configuring the RAID group other than the faulty disk drive and the normal disk drive in which the data is copied when the data copy in the data copying step is finished.

19. A method of using a disk drive in a disk array system according to claim 17, wherein the access processing step recovers a requested data based on data stored in the each disk drive configuring the RAID group other than the faulty disk drive when a read request directed to the faulty disk drive is detected in the access request detecting step.

20. A method of using a disk drive in a disk array system according to claim 17, wherein the data copying step restores data stored in the faulty disk drive based on data stored in the each disk drive configuring the RAID group other than the faulty disk drive and copies the recovered data to the normal disk drives.

* * * * *